(12) United States Patent
Ono

(10) Patent No.: US 8,977,046 B2
(45) Date of Patent: Mar. 10, 2015

(54) IMAGE PROCESSING DEVICE, IMAGE PROCESSING METHOD, AND STORAGE MEDIUM STORING IMAGE PROCESSING PROGRAM WITH COLOR TO PATTERN CORRELATION

(71) Applicant: Seiko Epson Corporation, Tokyo (JP)

(72) Inventor: Satoru Ono, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 153 days.

(21) Appl. No.: 13/759,424

(22) Filed: Feb. 5, 2013

(65) Prior Publication Data

US 2013/0208980 A1    Aug. 15, 2013

(30) Foreign Application Priority Data

Feb. 13, 2012  (JP) ................................. 2012-028093
Feb. 13, 2012  (JP) ................................. 2012-028094

(51) Int. Cl.
G06K 9/00 (2006.01)
G06T 7/60 (2006.01)
H04N 1/40 (2006.01)

(52) U.S. Cl.
CPC ... *G06T 7/60* (2013.01); *H04N 1/40* (2013.01)
USPC ........................................................ 382/165

(58) Field of Classification Search
None
See application file for complete search history.

(56) References Cited

U.S. PATENT DOCUMENTS

| 4,703,318 | A | * | 10/1987 | Haggerty | 345/634 |
| 5,153,576 | A | * | 10/1992 | Harrington | 345/596 |
| 5,691,827 | A | * | 11/1997 | Kamei et al. | 358/530 |
| 5,726,781 | A | * | 3/1998 | Isemura et al. | 358/530 |
| 5,898,819 | A | * | 4/1999 | Austin et al. | 358/1.9 |
| 7,009,739 | B1 | * | 3/2006 | Lin et al. | 358/500 |
| 2005/0280874 | A1 | * | 12/2005 | Noel | 358/3.13 |

FOREIGN PATENT DOCUMENTS

| EP | 0 446 008 A2 | 9/1991 |
| JP | 11-017961 A | 1/1999 |

\* cited by examiner

*Primary Examiner* — Bhavesh Mehta
*Assistant Examiner* — Feng Niu
(74) *Attorney, Agent, or Firm* — Maschoff Brennan

(57) ABSTRACT

An image processing device includes a pattern type determination unit in which a predetermined pattern is determined corresponding to color information of an image; a region setting unit in which a predetermined region in the image is set; an image data generation unit in which image data including the image and the pattern are included; and a size correction unit in which a size of the pattern is changed corresponding to a size of the region, or a position correction unit in which a positional relationship between a characteristic portion from which a type of the pattern included in the pattern which is determined in the pattern type determination unit can be discriminated and the region which is set in the region setting unit is corrected.

10 Claims, 26 Drawing Sheets

PT

| COLOR VALUE | | | PATTERN TYPE | FOREGROUND DENSITY | BACKGROUND DENSITY |
| --- | --- | --- | --- | --- | --- |
| R | G | B | | | |
| 255 | 0 | 0 | GRID LINE | 128 | 186 |
| 254 | 0 | 0 | GRID LINE | 128 | 186 |
| ⋮ | | | | | |
| 239 | 0 | 0 | GRID LINE | 232 | 177 |
| ⋮ | | | | | |
| 0 | 0 | 239 | HORIZONTAL LINE | 253 | 221 |
| ⋮ | | | | | |
| 0 | 0 | 0 | NONE | 0 | 0 |

| COLOR VALUE | | | PATTERN TYPE | FOREGROUND DENSITY | BACKGROUND DENSITY |
|---|---|---|---|---|---|
| R | G | B | | | |
| 255 | 0 | 0 | GRID LINE | 128 | 186 |
| 254 | 0 | 0 | GRID LINE | 128 | 186 |
| ⋮ | | | | | |
| 239 | 0 | 0 | GRID LINE | 232 | 177 |
| ⋮ | | | | | |
| 0 | 0 | 239 | HORIZONTAL LINE | 253 | 221 |
| ⋮ | | | | | |
| 0 | 0 | 0 | NONE | 0 | 0 |

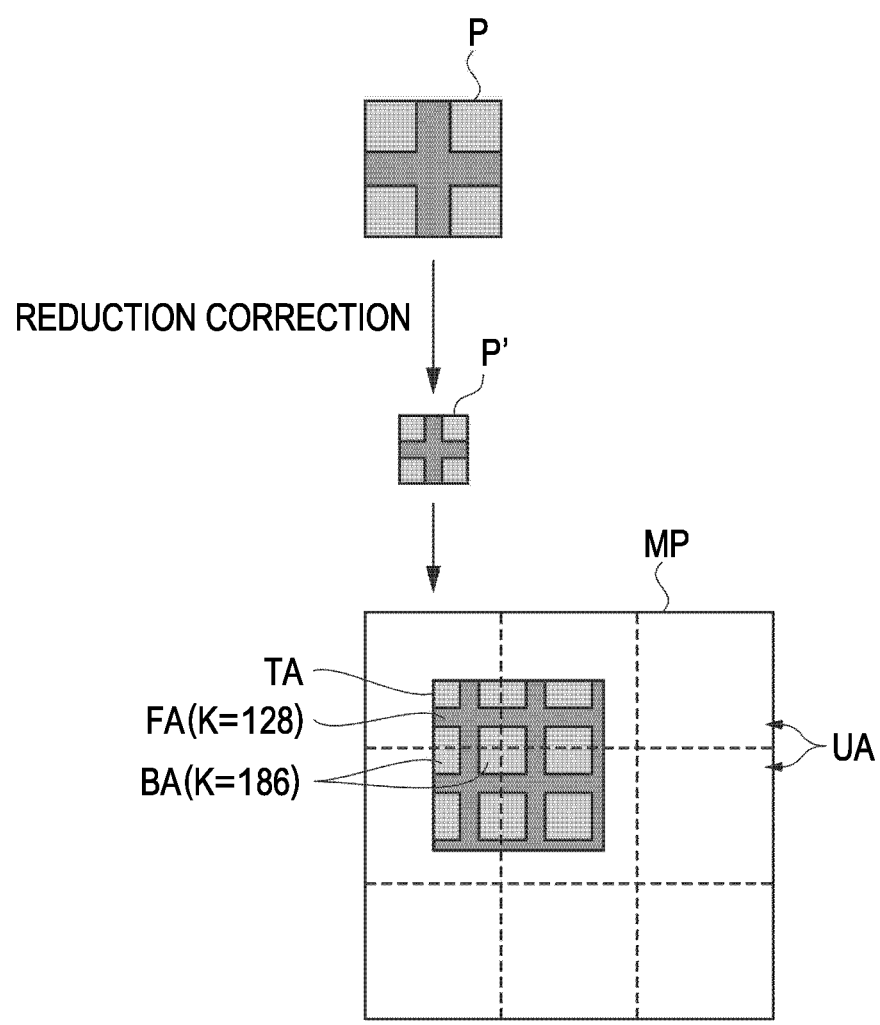

IMAGE PROCESSING DEVICE, IMAGE PROCESSING METHOD, AND STORAGE MEDIUM STORING IMAGE PROCESSING PROGRAM WITH COLOR TO PATTERN CORRELATION

BACKGROUND

1. Technical Field

The present invention relates to an image processing device which performs image processing of color image data, an image processing method, and a storage medium which stores an image processing program.

2. Related Art

In the related art, it was difficult to distinguish color of which brightness becomes the same in an image which is made to be monochrome. Therefore, in JP-A-11-17961, a technology has been proposed in which patterns which are caused to correspond to the original color image data based on each of three primary color components in which color information of color image data is separated are generated. According to the technology which is described in JP-A-11-17961, a difference in color in the original color image is reflected in an output image as a different pattern. By printing the output image, it is possible to understand color which is different in the same color image, even when the color image is printed in monochrome.

However, in the technology in JP-A-11-17961, since patterns are generated based on hue, a chroma, luminance or the like in each of the three primary color components, enormous types of patterns are generated. For this reason, it is difficult for a user to distinguish a pattern of which a characteristic portion, from which a type of a pattern can be discriminated, is similar, and to understand a difference in color in the original color image. In addition, when the technology in JP-A-11-17961 is used in a small area, there may be a case in which it is not possible to express all of the characteristic portions in which the type of the pattern can be discriminated, in the region depending on the type of the pattern, and in this case, it is not possible to discriminate the type of the pattern, and it is difficult to recognize the color of the original color image.

SUMMARY

The invention can be realized in the following forms or application examples.

Application Example 1

According to Application Example 1, there is provided an image processing device which includes a pattern type determination unit in which a predetermined pattern is determined corresponding to color information of an image; a region setting unit in which a predetermined region in the image is set; an image data generation unit in which image data including the image and the pattern are included; and a size correction unit in which a size of the pattern is changed corresponding to a size of the region, or a position correction unit in which a positional relationship between a characteristic portion from which a type of the pattern included in the pattern which is determined in the pattern type determination unit can be determined and the region which is set in the region setting unit is corrected, in which, when the position correction unit is included, an applying position of the characteristic portion in the region can be corrected toward a center of gravity of the region by the position correction unit.

According to the image processing device, the applying position of a pattern of a characteristic portion in a predetermined region of the original image is corrected toward a center of gravity of the region. Accordingly, it is possible to easily discriminate a type of a pattern in a predetermined region of a small area, and to distinguish a difference in color. In addition, the original image is generated and corrected as image data to which a pattern corresponding to color information of the original image is applied. Accordingly, it is possible to easily distinguish the difference in color in the original image by determining a type of the pattern expressed in image data which is generated and corrected. Alternatively, a size of the pattern which is applied corresponding to a size of the predetermined region of the original image is also changed. Accordingly, a user is able to distinguish the difference in color by easily determining the type of pattern even in the predetermined region of a small area. In addition, the original image is generated and corrected as image data to which a pattern corresponding to the color information of the original image is applied. Accordingly, it is possible to easily distinguish the difference in color in the original image by determining the type of the pattern which is expressed in the generated and corrected image data.

Application Example 2

In the image processing device according to Application Example 1, when the region is a minimum unit or more in which the region can express the characteristic portion, a correction of an application position of the characteristic portion is performed.

According to this configuration, even when a region in which the pattern is expressed is small, a user is able to easily distinguish a corresponding relationship in color from a pattern.

Application Example 3

In the image processing device according to Application Example 1, when the region is less than the minimum unit in which the region can express the characteristic portion from which a type of the pattern can be discriminated, a size of the pattern is subject to a reduction correction by the size correction unit.

According to this configuration, since correction processing in which a size of a pattern is reduced with respect to a small target region, it is possible for a user to distinguish a corresponding relationship in color from a pattern in a small region, even when a region in which the pattern is expressed is small.

Application Example 4

In the image processing device according to Application Example 1, a change in size of the pattern of the same type which is applied to the plurality of regions is performed at the same magnification by the size correction unit.

According to this configuration, the same pattern which is subject to the correction processing at the same magnification is reflected in the plurality of regions to which the pattern of the same type is applied. Accordingly, it is possible to understand that the plurality of regions correspond to the same color as each other.

Application Example 5

In the image processing device according to Application Example 1, a density of the pattern and/or a density of the image are changed by the image data generation unit corresponding to the color information.

According to this configuration, since the density of the pattern and/or the density of the image are changed corresponding to the color information of the original image, a user is able to easily discriminate a corresponding relationship in the color of the original image.

Application Example 6

The image processing device according to Application Example 1, further includes a storage unit in which corresponding information, in which the color information, and the patterns of a smaller number than the number of pieces of color information are correlated with each other, is stored.

According to this configuration, since a pattern corresponding to the color information of an image is unambiguously determined, it is possible to reduce a load in generation processing of image data. In addition, since it is possible to reduce the number of types of patterns with respect to color information of an image, and it is possible to suppress a possibility that the characteristic portion from which a type of a pattern can be discriminated becomes similar, it is possible for a user to easily discriminate the corresponding relationship in the color of the original image.

Application Example 7

In the image processing device according to Application Example 1, the region is a region which denotes a legend.

According to this configuration, a user is able to obtain image data from which a corresponding relationship in color between a graph and the legend can be easily understood.

Application Example 8

In the image processing device according to Application Example 1, the image data is monochrome image data.

According to this configuration, it is possible for a user to obtain the monochrome image data from which a difference in color in the original color image can be easily distinguished.

Application Example 9

An image processing method according to Application Example 9 which includes determining a predetermined pattern corresponding to color information of an image; setting a predetermined region in the image; generating image data including the image and the pattern; and further includes changing a size of the pattern corresponding to a size of the region, or correcting a positional relationship between a characteristic portion from which a type of the pattern included in the determined pattern can be discriminated and the set region; and in which, when including the correcting of the positional relationship, an application position of the characteristic portion in the region is corrected toward a center of gravity of the region.

Application Example 10

A storage medium according to Application Example 10 which causes a computer to function as a pattern type determination unit in which a predetermined pattern is determined corresponding to color information of an image; a region setting unit in which a predetermined region in the image is set; an image data generation unit in which image data including the image and the pattern is generated; and further a size correction unit in which a size of a pattern corresponding to a size of the region is changed; or a position correction unit in which a positional relationship between a characteristic portion from which a type of the pattern included in the pattern which is determined by the pattern type determination unit can be discriminated and the region which is set by the region setting unit is corrected, and in which, when the computer is caused to function as the position correction unit, an applying position of the characteristic portion in the region is corrected toward a center of gravity of the region by the position correction unit.

According to the storage medium which stores these image processing method and image processing program, an applying position of a characteristic portion of a pattern in a predetermined region of the original image is corrected toward the center of gravity of a region. Accordingly, a user is able to easily discriminate a type of a pattern even in a predetermined region of a small area, and to distinguish a difference in color. In addition, the original image is generated and corrected as image data to which a pattern corresponding to color information of the original image is applied. Accordingly, it is possible to easily distinguish a difference in color in the original image by discriminating a type of a pattern which is expressed in the generated and corrected image data. In addition, a size of the pattern which is applied corresponding to a size of a predetermined region of the original image is also changed. Accordingly, a user is able to easily discriminate a type of a pattern even in a predetermined region of a small area, and to distinguish the difference in color. In addition, the original image is generated and corrected as image data to which a pattern corresponding to the color information of the original image is applied. Accordingly, it is possible to easily distinguish the difference in color in the original image by discriminating a type of a pattern which is expressed in the generated and corrected image data.

BRIEF DESCRIPTION OF THE DRAWINGS

The invention will be described with reference to the accompanying drawings, wherein like numbers reference like elements.

FIG. 22 is a diagram which illustrates a result to which reduction correction processing according to the second embodiment is performed.

DESCRIPTION OF EXEMPLARY EMBODIMENTS

Hereinafter, a first embodiment of the present invention will be described with reference to drawings. In addition, in the first embodiment, a printing system including a computer as an example of an image processing device will be described.

Figure 1:
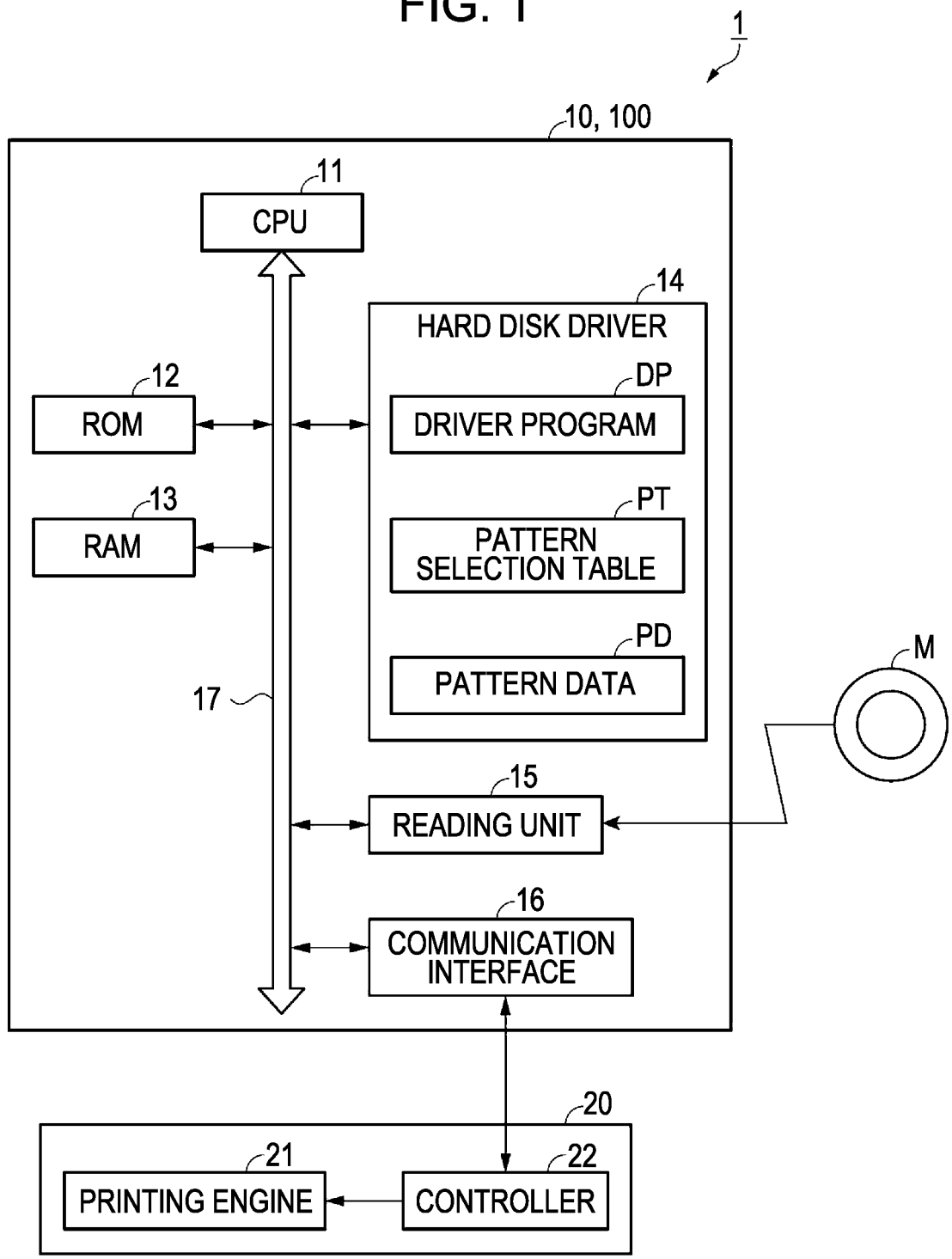
FIG. 1 is a diagram which illustrates a schematic configuration of a printing system according to a first embodiment.

FIG. 1 is a diagram which illustrates a schematic configuration of a printing system 1. As illustrated in FIG. 1, the printing system 1 includes a computer 10, and a printing unit 20, and the computer 10 and the printing unit 20 are connected to each other to be able to perform mutual data communication.

The printing unit 20 includes a printing engine 21 which performs printing on a medium such as a sheet or the like, and a controller 22 which controls an operation or the like of the printing engine 21. The printing unit 20 performs processing of receiving a printing job from the computer 10, processing of causing the printing engine 21 to execute printing according to the printing job, or the like, due to a control of the controller 22.

The computer 10 is, for example, a general purpose personal computer in which a printing unit driver is installed, and a host device of the printing unit 20 which transmits a printing job with respect to the printing unit 20. The computer 10 includes a CPU 11, a ROM 12, a RAM 13, a hard disk drive 14, a reading unit 15, and a communication interface 16. In addition, these configurations in the computer 10 are connected to a bus 17, and are configured so as to be able to perform data communication with each other through the bus 17.

The CPU 11 is a control device which controls each configuration of the computer 10. The ROM 12 is a non-volatile memory in which a predetermined program for controlling the computer 10 is recorded, and the RAM 13 is a general-purpose memory which is used as a working memory, or the like.

The hard disk drive 14 is stored with a driver program DP of the printing unit 20, and a pattern selection table PT and pattern data PD to be described later, in advance. The driver program DP is supplied to the computer 10 through a recording medium M on which the driver program DP is recorded, and the hard disk drive 14 is stored with a program which is read out from the recording medium M by the reading unit 15. In addition, as examples of the recording medium M, there are an optical disc such as a CD-ROM, and a DVD-ROM, and a portable recording medium such as a flexible disk, a magneto-optical disc, a USB memory, and a memory card. Further, the recording medium M is recorded with the pattern selection table PT and the pattern data PD, and the pattern selection table PT and the pattern data PD are stored in the hard disk drive 14 along with the driver program DP. In fact, supplying modes of the driver program DP, the pattern selection table PT, and the pattern data PD to the computer 10 are not limited to this, and the driver program DP, the pattern selection table PT, and the pattern data PD may be supplied from a predetermined server, for example, through an electric communication line, or an optical communication line.

The communication interface 16 is a portion of an interface which is connected to the printing unit 20 through a cable, or radio communication. Communication between the printing unit 20 and the computer 10 is performed through the communication interface 16.

In addition, when the CPU 11 of the computer 10 executes the driver program DP which is stored in the hard disk drive 14 by reading out, the printing unit driver is installed. In this manner, the computer 10 functions as an image processing device 100.

Figure 2:
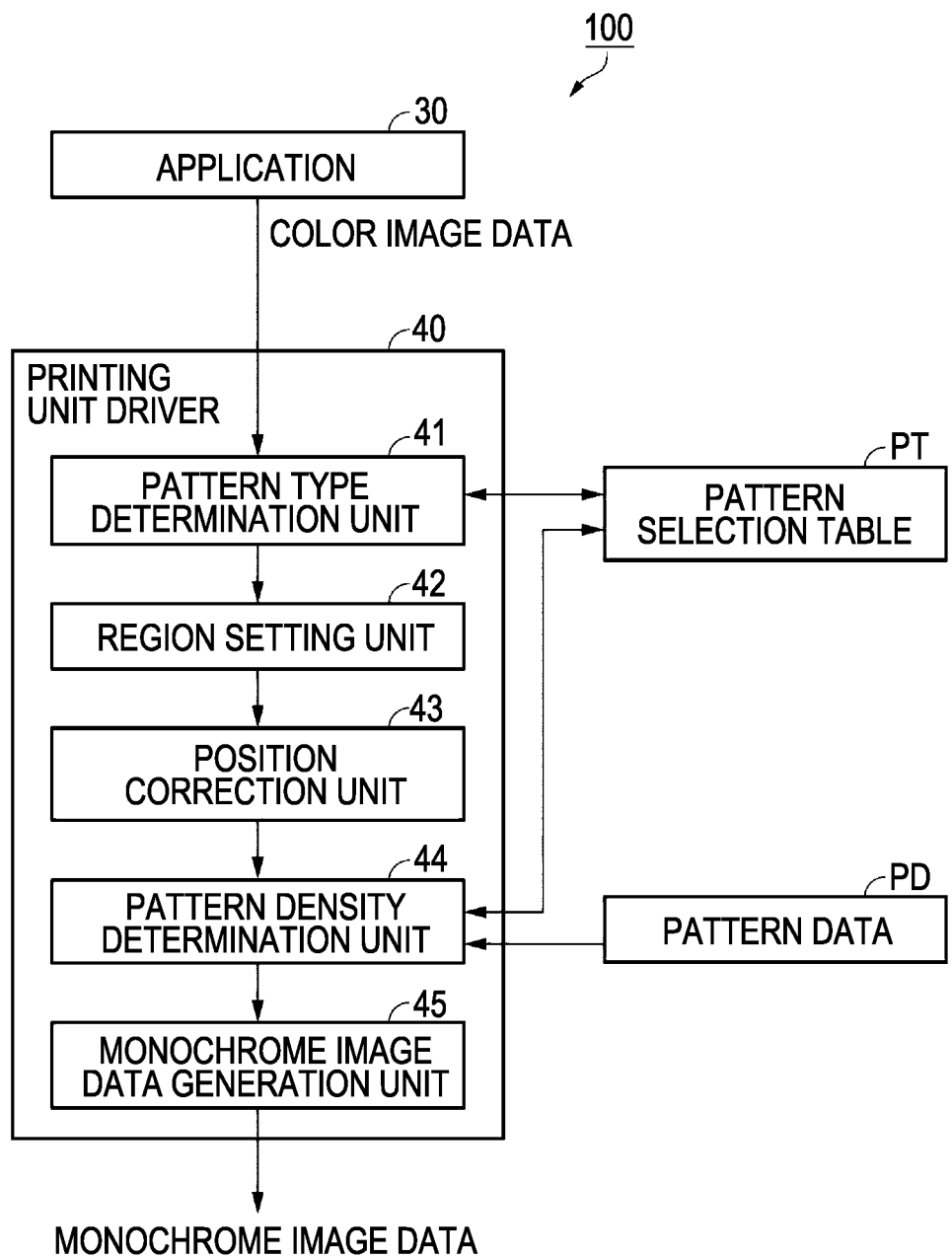
FIG. 2 is a diagram which illustrates a software configuration of an image processing device according to the first embodiment.

Subsequently, the image processing device 100 will be described. FIG. 2 is a diagram which illustrates a software configuration of the image processing device 100. As illustrated in FIG. 2, the image processing device 100 includes an application 30, and a printing unit driver 40.

The application 30 is software as a print demanding source with respect to the printing unit 20 such as document creating software, a web browser, or the like. The application 30 generates color image data as a printing request, and a printing target, and delivers the color image data to the printing unit driver 40.

The printing unit driver 40 is software for controlling printing using the printing unit 20. The printing unit driver 40 generates printing data with a data format which can be processed by the printing unit 20 from the printing request, and the color image data which are received from the application 30, and transmits the printing data to the printing unit 20 through the communication interface 16. In this manner, the printing unit driver 40 causes the printing unit 20 to execute printing.

In addition, the printing unit driver 40 according to the first embodiment has a function of causing the printing unit 20 to print a difference in color in the original color image as a monochrome image which can be distinguished by a hatch pattern, by converting the color image data as the original image data into monochrome image data with the hatch pattern. In order to execute the function of monochrome printing with the hatch pattern, the printing unit driver 40 includes a pattern type determination unit 41, a region setting unit 42, and a position correction unit 43, a pattern density determination unit 44, and a monochrome image data generation unit (image data generation unit) 45. In addition, these configurations of the printing unit driver 40 function when the CPU 11 executes the driver program DP.

The pattern type determination unit 41 performs a process of determining a hatch pattern which is applied to the image region of the color image data according to color information of a color image of the color image data, and in particular, to hue information. In addition, according to the first embodiment, a plurality of types of hatch patterns are used in which hatch patterns such as a vertical line, a horizontal line, a grid line, an oblique line, an oblique grid line, and the like are expressed in monochrome density.

Figure 3:
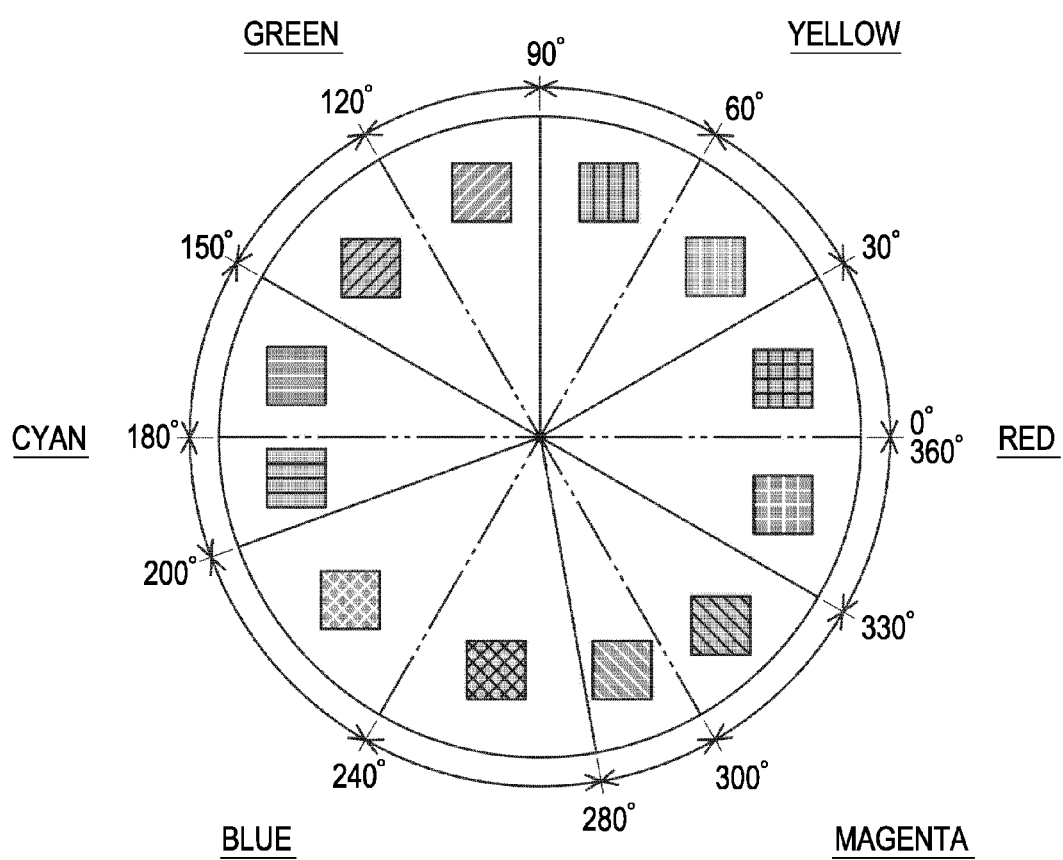
FIG. 3 is a diagram which illustrates a corresponding example between hue and hatch patterns on a hue circle according to the first embodiment.

FIG. 3 is a diagram which illustrates an example in which a hue and a hatch pattern correspond to each other. As illustrated in FIG. 3, a predetermined hatch pattern is allocated in each color region in which a hue circle of color is partitioned with respect to the hue. In the example in FIG. 3, the hue on the hue circle is partitioned into twelve color regions, and patterns such as the vertical line, the horizontal line, the grid line, the oblique line, the oblique grid line, and the like are allocated as the hatch pattern in advance in each color region. The pattern type determination unit 41 selects a hatch pattern to be applied according to the hue of a color image from the plurality of types of the hatch patterns. In fact, according to the first embodiment, a different hatch pattern is selected according to the hue from the plurality of hatch patterns, however, it is also possible to select a different hatch pattern according to brightness, or chroma.

The region setting unit 42 performs a process of setting a target region as a target to which the above described hatch pattern is applied in an image region of a color image.

The position correction unit 43 performs position correction processing in which a hatch pattern is moved with respect to a target region. The position correction processing will be described in detail later.

The pattern density determination unit 44 performs the process of determining a density of a hatch pattern according to color of a color image of color image data, and in particular, to brightness. In addition, the hatch pattern according to the first embodiment includes a foreground region as the hatch pattern itself, and a background region which becomes a background with respect to the hatch pattern as the foreground. The pattern density determination unit 44 determines a monochrome density in the foreground region (hereinafter, referred to as "foreground density"), and a monochrome density in the background region (hereinafter, referred to as "background density").

The monochrome image data generation unit 45 has a hatch pattern which is determined by the pattern type determination unit 41, and performs a process of applying a hatch pattern having the foreground density and background density which are determined by the pattern density determination unit 44 to a target region among image regions of a color image. In this manner, the monochrome image data generation unit 45 generates monochrome image data with a hatch pattern which is expressed by the applied hatch pattern.

In addition, processes by the above described pattern type determination unit 41 and the pattern density determination unit 44 are performed according to the pattern selection table (corresponding information) PT, and the pattern data PD. Subsequently, in order to describe a method of converting color image data to monochrome image data with a hatch pattern, the pattern selection table PT and the pattern data PD will be described. In addition, in descriptions below, the color image data includes an RGB value which expresses each color of R (red), G (green), and B (blue) using grayscale values of "0 to 255" of 8 bits with respect to each pixel in a color image. The monochrome image data has the K value in which the color of K (black) is expressed by the grayscale values of "0 to 255" of 8 bits in each pixel in a monochrome image, that is, density of the monochromatic K. Further, regarding the RGB value of the color image data, (R, G, B)=(255, 255, 255) corresponds to white, (R, G, B)=(0, 0, 0) corresponds to black, and regarding the K value, K=0 corresponds to black, and K=255 corresponds to white. In fact, according to the first embodiment, the above described color image data and the monochrome image data are described as examples, however, data formats of the color image data and monochrome image data are not limited to this.

Figure 4:
FIG. 4 is a diagram which illustrates an example of a pattern selection table according to the first embodiment.

FIG. 4 is a diagram which illustrates an example of the pattern selection table PT. As illustrated in FIG. 4, a type of the pattern, the foreground density, and the background density are correlated with the RGB value as a color value in advance in the pattern selection table PT.

As described in FIG. 3, a type of a hatch pattern corresponding to a color value among the plurality of types of the hatch patterns such as the vertical line, the horizontal line, the grid line, the oblique line, the oblique grid line, and the like is designated in a section of the pattern type of the pattern selection table PT. The smaller number of types of the hatch patterns than the number of combinations of color values having at least one piece of color information is designated. That is, when color information of the color image is determined, a type of the hatch pattern corresponding thereto is unambiguously determined, accordingly, the number of types of hatch pattern is designated so as to reduce a load in generation processing of the monochrome image data. In addition, since it is possible to reduce the number of types of hatch pattern with respect to the color information of an image, the number of types of a similar hatch pattern can be suppressed, accordingly, it is designated such that it is possible for a user to easily discriminate a corresponding relationship between the color of the original color image and the monochrome image data with a hatch pattern which is expressed by the hatch pattern. The value of the foreground density which is caused to correspond to the color value is designated in the section of the foreground density.

A value of the background density which corresponds to the color value is designated in a section of the background density. In addition, the values of the foreground density and background density are predetermined before and after applying the hatch pattern so that the average brightness in an applying region becomes equal. In this manner, since the density of the pattern and/or the density of the image are changed corresponding to the color information of the original image, it is possible for a user to easily discriminate the corresponding relationship in color of the original image.

A type of the hatch pattern, the foreground density, and the background density corresponding to a RGB value of a color image are determined by the pattern selection table PT. That is, when converting color image data to monochrome image data, the pattern type determination unit 41 selects a hatch pattern of the hatch pattern which is designated in the section of the pattern type of the pattern selection table PT with respect to an image region of color image data with reference to the pattern selection table PT. The pattern density determination unit 44 determines the background density of a hatch pattern to which a density is designated in the section of the background density of the pattern selection table PT, with reference to the pattern selection table PT, and determines the foreground density of a hatch pattern to the foreground density which is designated in the section of the foreground density of the pattern selection table PT.

On the other hand, image data of a corresponding hatch pattern is predetermined in each pattern type such as the vertical line, the horizontal line, the grid line, the oblique line, the oblique grid line, and the like in the pattern data PD. The hatch pattern is, for example, an image of a predetermined size such as pixels of 8×8 vertically and horizontally, and includes at least information denoting a background region and a foreground region in an image region of a hatch pattern. Accordingly, as described later, the pattern density determination unit 44 is able to determine whether the focused pixel in the image region corresponds to the background region, or to the foreground region, when a hatch pattern is applied to the image region of the color image by referring to the pattern data PD.

Subsequently, an outline of processing in which a hatch pattern P is applied to a color image will be described. Here, as illustrated in FIG. 5A, a color image CP having a color value of (R, G, B)=(255, 0, 0) in the whole image region will be described as an example.

Figure 5A:
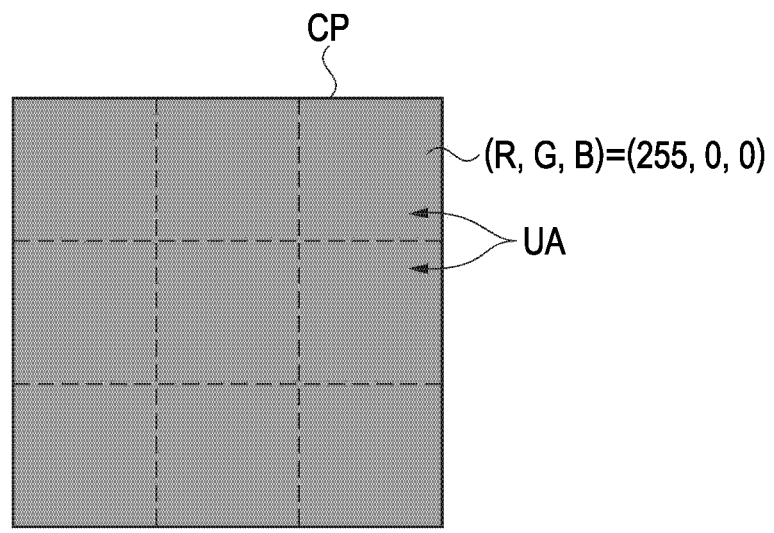
FIGS. 5A and 5B are explanatory diagrams which describe an allocation method of the hatch pattern according to the first embodiment.

In a process of applying the hatch pattern P in the color image CP, first, as illustrated in FIG. 5A, the hatch pattern P is allocated in each unit area UA in which an image region of the color image CP is partitioned with the same size as that of the hatch pattern P. At this time, a type of the hatch pattern P which is allocated to the unit area UA is determined according to the pattern selection table PT. According to the pattern selection table PT which is illustrated in FIG. 4, since the RGB value of the color image, that is, a pattern type corresponding to the color value of (R, G, B)=(255, 0, 0) is the "grid line", the hatch pattern P of the "grid line" is applied to the color image CP in FIG. 5A. Accordingly, as illustrated in FIG. 5B, in a monochrome image MP to which the color image CP is converted is applied with a hatch pattern P of the grid line in each unit area UA.

In addition, according to the pattern selection table PT in FIG. 4, a pattern type corresponding to the color value of (R, G, B)=(0, 0, 0) becomes "none". That is, the hatch pattern P is not applied to a region having the color value of (R, G, B)=(0, 0, 0) among the image regions of the color image, and the hatch pattern P is applied to a region having a color value other than the value of (R, G, B)=(0, 0, 0). Therefore, the region setting unit 42 sets a region having an other color value than the value of (R, G, B)=(0, 0, 0) as a target region TA as a target to which the hatch pattern P is applied (refer to FIGS. 6A and 6B).

Figure 5B:
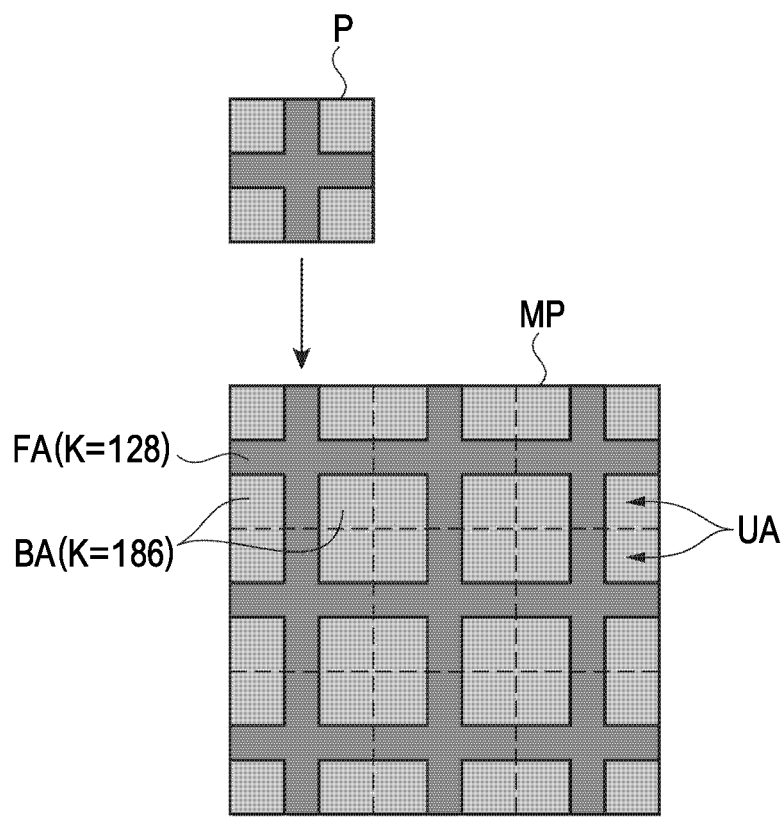

In addition, according to the pattern selection table PT which is illustrated in FIG. 4, since the foreground density of K=128, and the background density of K=186 are correlated with (R, G, B)=(255, 0, 0), as illustrated in FIG. 5B, a density of the foreground region FA becomes K=128, and a density of the background region BA becomes K=186 in the monochrome image MP. In this manner, a hatch pattern P which is determined by the pattern selection table PT and the pattern data PD is applied to the unit area UA. In addition, according to the first embodiment, by performing processing which corresponds to the table in this manner, it is possible to realize a high speed of processing in which the hatch pattern P is applied to the target area TA of the color image CP.

Figure 6A:
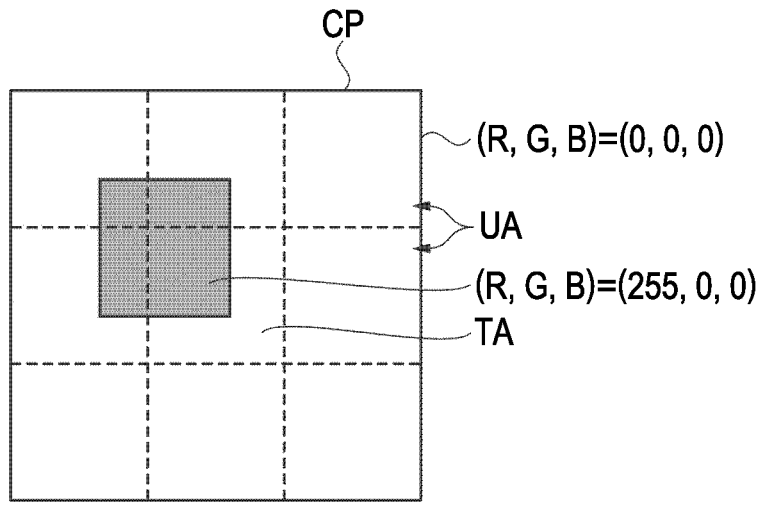
FIGS. 6A and 6B are diagrams which illustrate a result to which the hatch pattern according to the first embodiment is applied.
Figure 6B:
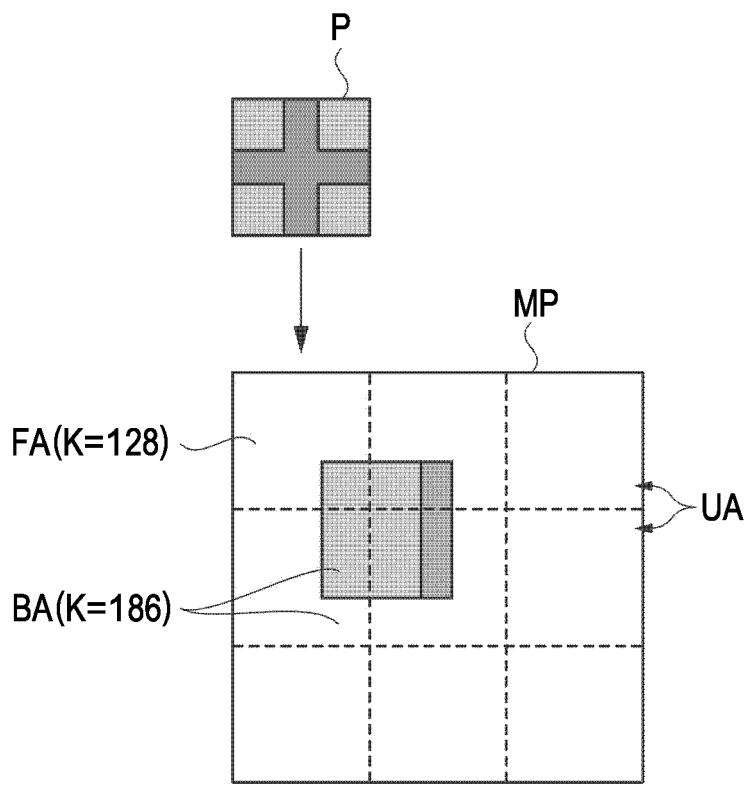

Here, as described above, when the hatch pattern P is applied so that the hatch pattern P is fitted into each unit area UA of the color image CP, there has been a case in which the hatch pattern P is not easily viewed. FIG. 6A illustrates an example of a color image CP in which a part of the target regions TA of the color image CP has a color value of (R, G, B)=(255, 0, 0), and other areas have a color value of (R, G, B)=(0, 0, 0). When the hatch pattern P of the grid line is applied in each unit area UA with respect to the color image CP which is illustrated in FIG. 6A, only the target region TA having the color value of (R, G, B)=(255, 0, 0) is applied with the hatch pattern P of the grid line, since the hatch pattern P is applied to the color value of (R, G, B)=(0, 0, 0) according to the pattern selection table PT in FIG. 4. In addition, in the example in FIG. 6A, since the target region TA is divided into four unit areas UA, when the hatch pattern P is applied to each unit area UA, as illustrated in FIG. 6B, there is a case in which, all portions in which lines configuring the grid line are crossed (characteristic portion to be described later) and are not expressed in the target region TA. For this reason, it is difficult for a user to discriminate the type of the hatch pattern P of the monochrome image MP only from the image in the target region TA, and to distinguish color of the original color image from the type of the hatch pattern P.

Figure 7A:
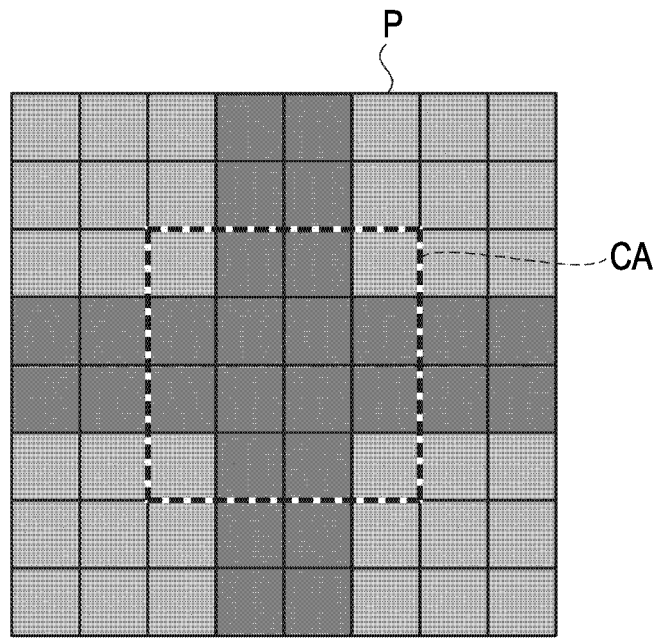
FIGS. 7A and 7B are explanatory diagrams which describe a characteristic portion of the hatch pattern according to the first embodiment.
Figure 7B:
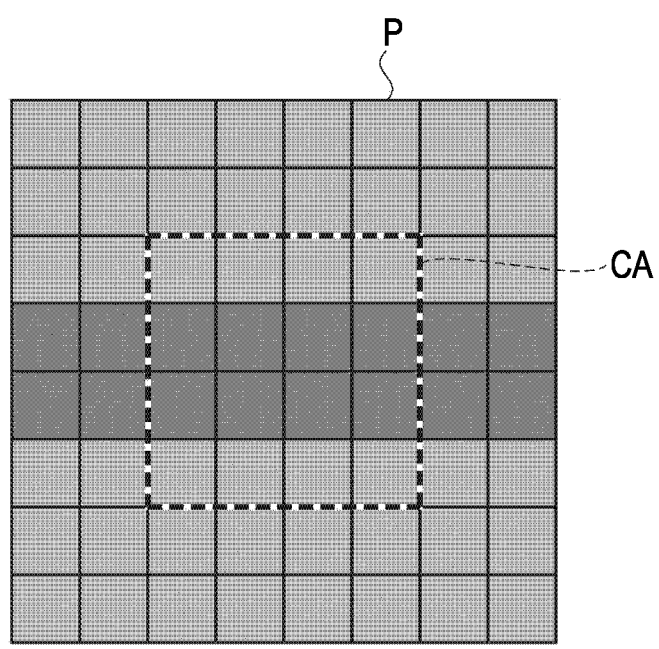

FIGS. 7A and 7B are diagrams which illustrate an example of a characteristic portion CA in the hatch pattern P. FIG. 7A illustrates the hatch pattern P of grid lines, and FIG. 7B illustrates an example of a hatch pattern P of the horizontal lines. The characteristic portion CA of the hatch pattern P is a part of regions among the regions of the hatch pattern P which enables a user to discriminate the type of the hatch pattern P. For example, when it is a hatch pattern P of the grid line, a region of a predetermined size, in which lines configuring the grid line are crossed, is set to the center becomes the characteristic portion CA. When it is a hatch pattern P of the horizontal line, a region of a predetermined size, in which a part of lines configuring the horizontal line, is set to the center becomes the characteristic portion CA. These characteristic portions CA are determined such that a user is able to discriminate a type of the hatch pattern P only from the pattern in the characteristic portion CA. That is, the characteristic portion CA is a region in which a law of the hatch pattern P such as the grid line, the horizontal line, or the like is expressed.

Figure 8A:
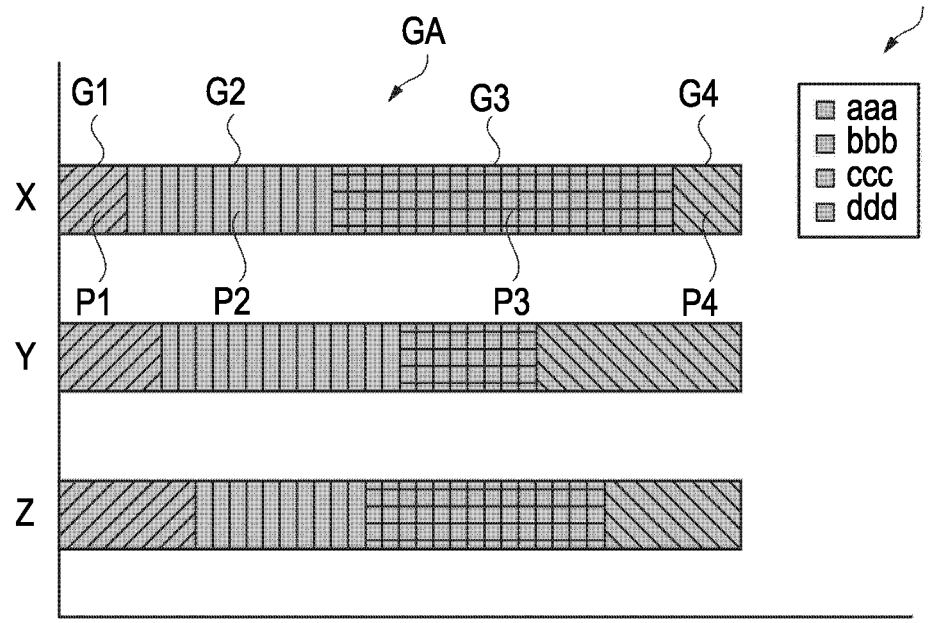
FIGS. 8A and 8B are diagrams which illustrate a result to which the hatch pattern is applied according to the first embodiment.
Figure 8B:
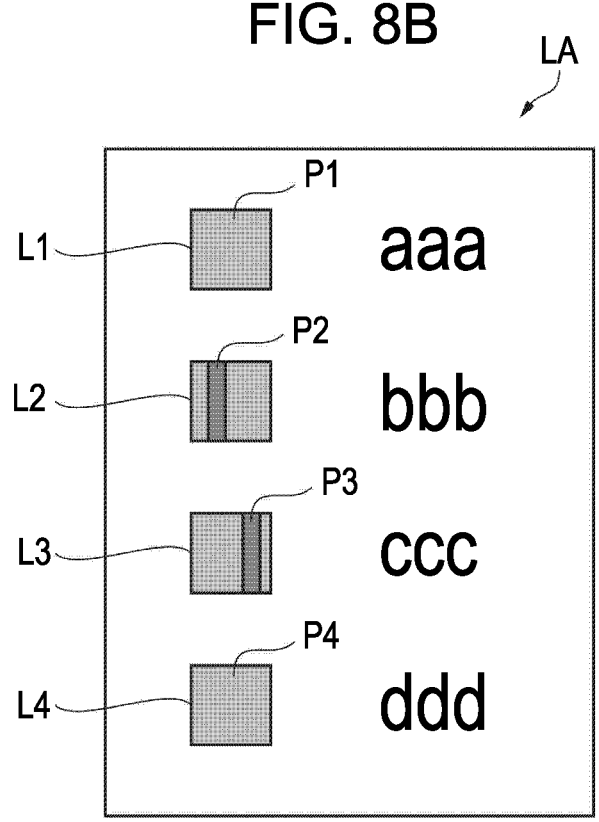

FIGS. 8A and 8B are diagrams which illustrate processing examples when the hatch pattern P is applied to a color image expressing a graph without performing position correction processing. As illustrated in FIG. 8A, regarding a region GA expressing the graph, the hatch patterns P1 to P4 corresponding to colors of the graph are allocated to each of the color regions G1 to G4 configuring the graph. In addition, as illustrated in FIG. 8B as an enlarged diagram of a region of the legend LA, even in the region of the legend LA, the hatch patterns P1 to P4 corresponding to colors used in the graph are allocated to each of the color regions L1 to L4 of the legends expressing a corresponding relationship in color used in the graph.

However, in general, since an area of the color region L (L1 to L4) of the legend expressing the corresponding relationship in color used in the graph is smaller than an area of a region GA expressing the graph, there is a case in which, in the color region L of the legend, only a part of the hatch patterns P which are illustrated in FIGS. 5A and 5B is reflected. In the example in FIG. 8B, the entire line configuring the hatch pattern P is not expressed with respect to the color regions L1 and L4, and it is not possible to determine a corresponding relationship between the color and the legend used in the graph. Regarding the color region L2, the entire line configuring the hatch pattern P is expressed, however, the line is located in a peripheral region which is deviated from the center of gravity of the color region L2. Regarding the color region L3, only a part of lines configuring the hatch pattern P is expressed, and further, even the expressed line is located in the peripheral region which is deviated from the center of gravity of the color region. For these reasons, it is difficult for a user to discriminate the hatch patterns P which are expressed in the color regions L1 to L4 of the legend region LA, and to make the graph and the legend to correspond to each other.

Therefore, according to the first embodiment, in the characteristic portion CA of the hatch pattern P, the hatch pattern P is moved so that the pattern is easily viewed, regarding small regions of the color regions L1 to L4 in the example in FIGS. 8A and 8B. For this reason, the position correction unit 43 performs the position correction processing in which the characteristic portion CA of the hatch pattern P is shifted toward the center of gravity of the target region TA as the target to which the hatch pattern P is applied.

Figure 9:
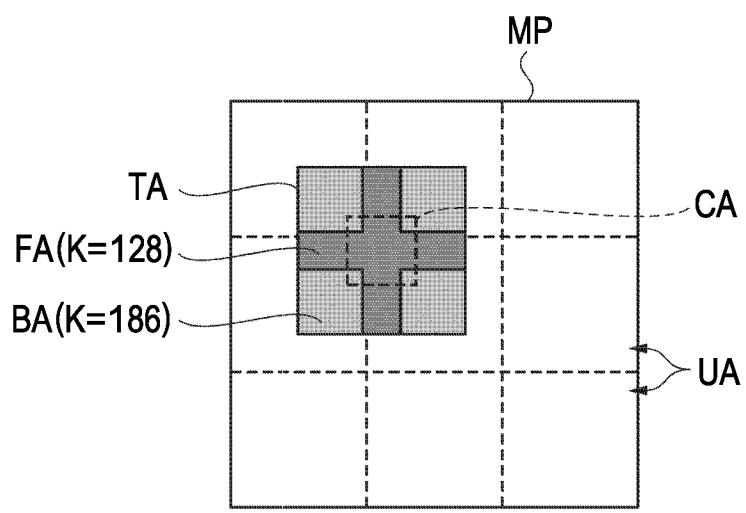
FIG. 9 is a diagram which illustrates a result in which position correction processing is performed according to the first embodiment.

Accordingly, as illustrated in FIG. 9, by performing the above described position correction processing, the monochrome image MP is generated in which the characteristic portion CA of the hatch pattern P is located at the center of gravity of the target region TA (point at which primary moment in outline of target region TA is 0, and the center of target region TA when it is region in which target region TA becomes a symmetrical shape about that point).

Subsequently, processes to be performed by the above described image processing device 100 will be described in detail with reference to the flowchart in FIG. 10.

Figure 10:
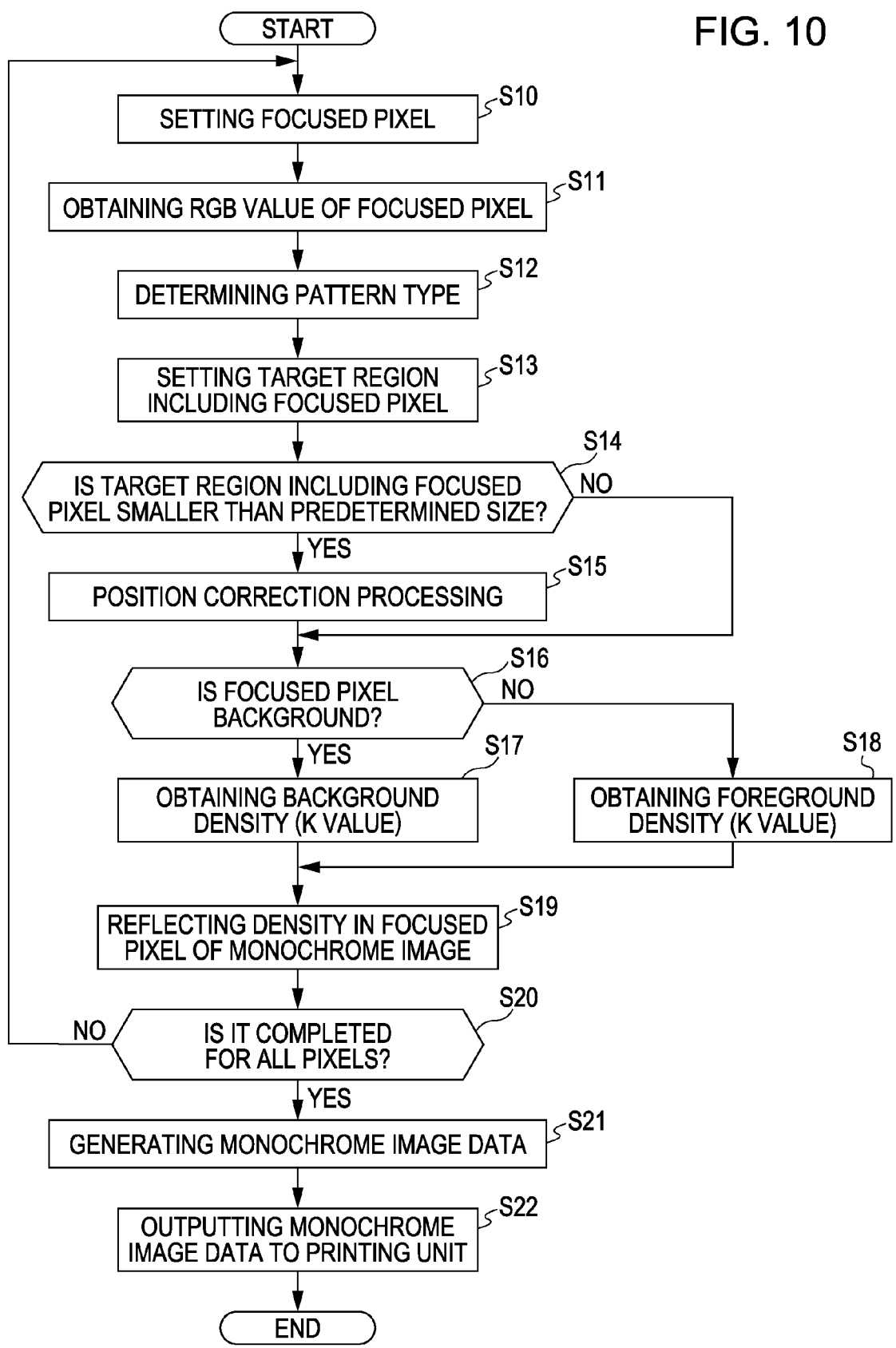
FIG. 10 is a flowchart which illustrates a flow of processing which is performed by the image processing device according to the first embodiment.

For example, when the printing unit driver 40 receives a printing instruction for performing monochrome printing of the color image data from the application 30, processing in FIG. 10 is started. When the processing is started, the pattern type determination unit 41 sets a focused pixel with respect to an image region of the color image data (step S10), and obtains an RGB value of the focused pixel from the color image data (step S11).

Subsequently, the pattern type determination unit 41 determines a pattern type corresponding to the obtained RGB value with reference to the pattern selection table PT (step S12).

Subsequently, the region setting unit 42 performs a process of setting the target region TA including the focused pixel (step S13). Here, a process of specifying a color image region to which the hatch pattern P is applied as the target region TA is performed by scanning pixels in the periphery of the focused pixel. According to the first embodiment, a region having a color value other than the value of (R, G, B)=(0, 0, 0) is set to the target region TA according to the pattern selection table PT. For example, if it is an example of the color image of the graph which is described in FIGS. 8A and 8B, a color region L expressing a color corresponding relationship between the graph and the legend is set as the target region TA. In fact, a method of setting the target region TA is not limited to this, and it is also preferable to set the target region TA by scanning the entire color image at a timing before setting the focused pixel. In addition, as a method of determining the target region TA, it is not limited to the method in which regions other than (R, G, B)=(0, 0, 0) are set to the target region TA, and for example, it is also preferable to determine a region having a larger RGB value than the predetermined RGB value as the target region TA.

Subsequently, the position correction unit 43 determines whether or not the target region TA including the focused pixel is smaller than the predetermined size (step S14).

Figure 11:
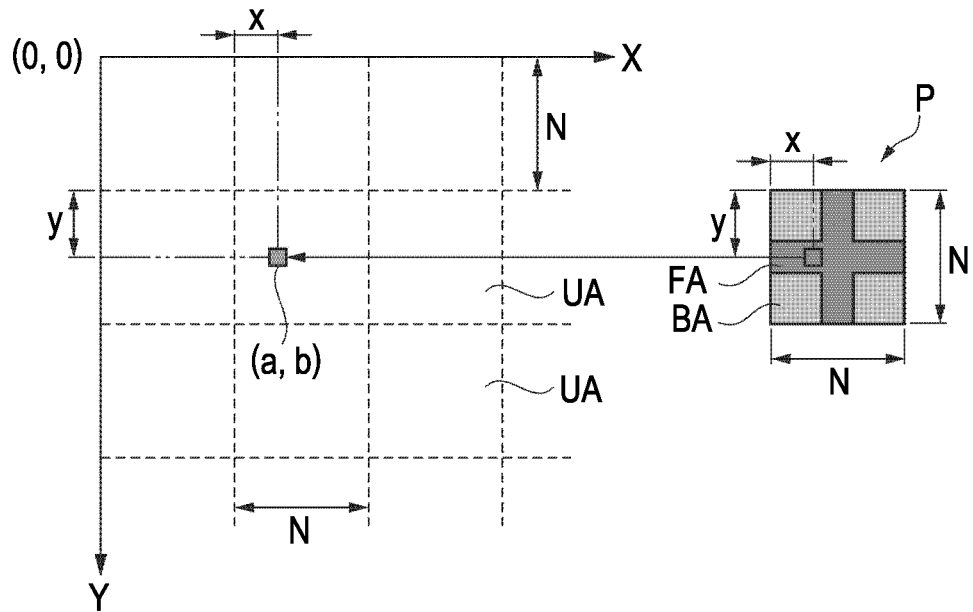
FIG. 11 is an explanatory diagram which describes an allocation method of the hatch pattern according to the first embodiment.

When the target region TA including the focused pixels is larger than the predetermined size (No in step S14), the position correction processing is not performed, the process proceeds to step S16, and the pattern density determination unit 44 determines whether or not the focused pixel corresponds to the background of the hatch pattern P. As described in FIGS. 5A and 5B, since the hatch pattern P is allocated to each unit area UA among the image regions of the color image, here, whether the coordinates of the focused pixel are located at the position corresponding to the background, or the foreground in the hatch pattern P which is allocated in each unit area UA is determined. Specifically, as illustrated in FIG. 11, the coordinates of the focused pixel are set to (a, b), and the size of the hatch pattern P is set to N×N pixels, relative coordinates (x, y) of the focused pixel in the hatch pattern P are obtained using the following expressions (1) and (2). The pattern density determination unit 44 determines whether the relative coordinates (x, y) of the focused pixel correspond to the background, or to the foreground in the hatch pattern P with reference to the image data of the hatch pattern P in the pattern data PD. In addition, in the following expression, "mod" is an operator which gives back the rest which is divided.

$$x = a \bmod N \quad (1)$$

$$y = b \bmod N \quad (2)$$

When the focused pixel corresponds to the background (Yes in step S16), the pattern density determination unit 44 obtains a K value of the background density corresponding to the RGB value of the focused pixel with reference to the pattern selection table PT (step S17). On the other hand, when the focused pixel corresponds to the foreground region (No in step S16), the pattern density determination unit 44 obtains a K value of the foreground density corresponding to the RGB value of the focused pixel with reference to the pattern selection table PT (step S18). In the example in FIG. 11, since the relative coordinates (x, y) corresponding to the focused pixel (a, b) correspond to the foreground region FA of the hatch pattern P, the K value of the foreground density is obtained with respect to the focused pixel.

Figure 12:
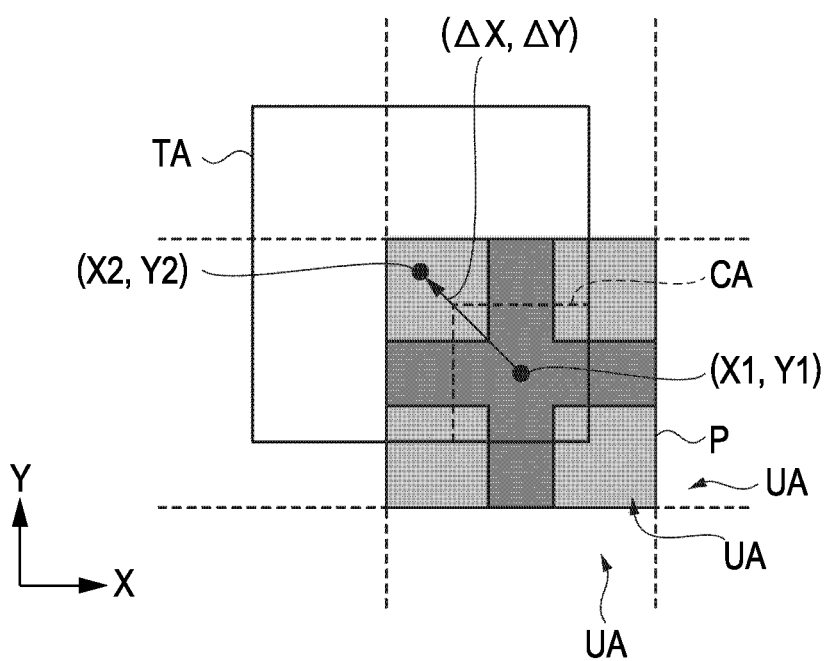
FIG. 12 is a conceptual diagram of position correction processing according to the first embodiment.

On the other hand, in a determination in step S14, when the target region TA including a focused pixel is smaller than the predetermined size (Yes in step S14), the position correction unit 43 performs the position correction processing (step S15). FIG. 12 is a conceptual diagram of the position correction processing. As illustrated in FIG. 12, if the center coordinates of the characteristic portion CA of the hatch pattern P, which is allocated to the unit area UA, is set to (X1, Y1), and the coordinates of the center of gravity of the target region TA are set to (X2, Y2) when the position correction processing is not performed, a position deviation amount (ΔX, ΔY) between the characteristic portion CA and the target region TA is obtained using the following expressions (5) and (6). In the position correction processing, the center of the characteristic portion TA of the hatch pattern P is shifted to the center of gravity of the target region TA by moving the hatch pattern P using the position deviation amount (ΔX, ΔY) as a correction amount.

$$\Delta X = X2 - X1 \quad (5)$$

$$\Delta Y = Y2 - Y1 \quad (6)$$

When the position correction processing is performed, the pattern density determination unit 44 determines whether or not the focused pixel corresponds to the background of the hatch pattern P after shifting (step S16), and when the focused pixel corresponds to the background (Yes in step S16), the background density is obtained by referring to the pattern selection table PT (step S17). When the focused pixel does not correspond to the background, that is, it corresponds to the foreground (No in step S16), the foreground density is obtained by referring to the pattern selection table PT (step S18).

In step S17, or S18, when the pattern density determination unit 44 obtains the K value of the background density, or the foreground density, the monochrome image data generation unit 45 makes the K value as the obtained density be reflected in a pixel corresponding to the focused pixel among the image regions of the monochrome image (step S19). In this manner, the pixel of the monochrome image corresponding to the focused pixel has the K value as the density corresponding to the hatch pattern P of a type which is determined in step S12.

In addition, the above described position correction processing can also be executed by performing a conversion of coordinates of the focused pixel. For example, as described in FIG. 12, when the hatch pattern P is shifted by a correction amount of the position deviation amount ($\Delta X$, $\Delta Y$), it is possible to determine whether the focused pixel is the background region BA, or the foreground region FA by determining whether the coordinates, in which relative coordinates (x, y) of the focused pixel are moved by the correction amount, are the background region BA, or the foreground region FA with reference to image data of the pattern data PD. In this manner, when the position correction processing is executed by performing the coordinates conversion of the coordinates which are used when referring to the pattern data PD, it is possible to reduce an operation amount which is necessary for the position correction processing, and to obtain a high speed of the processing compared to a case in which image data of the shifted hatch pattern P is generated in practice.

When the background density, or the foreground density is reflected in the focused pixel, the monochrome image data generation unit 45 determines whether or not the processes of steps S10 to S19 are performed with respect to all of the e pixels of the color image (step S20). When the process is not finished with respect to all of the pixels (No in step S20), the process returns to step S10, and for example, a new focused pixel is set by scanning the focused pixel in the raster direction, and processes after step S11 are performed with respect to the new focused pixel. When processes are finished with respect to the whole pixel (Yes in step S20), the monochrome image data generation unit 45 generates monochrome image data of the monochrome image (step S21), since it becomes a state in which the whole pixel of the monochrome image has the K value as the density corresponding to the hatch pattern P of a type which is determined in step S12. The generated monochrome image data is output to the printing unit 20 by the printing unit driver 40 (step S22). In this manner, a monochrome image with the hatch pattern corresponding to the color of the color image is printed as monochrome printing of the color image data which is delivered from the application 30.

Figure 13:
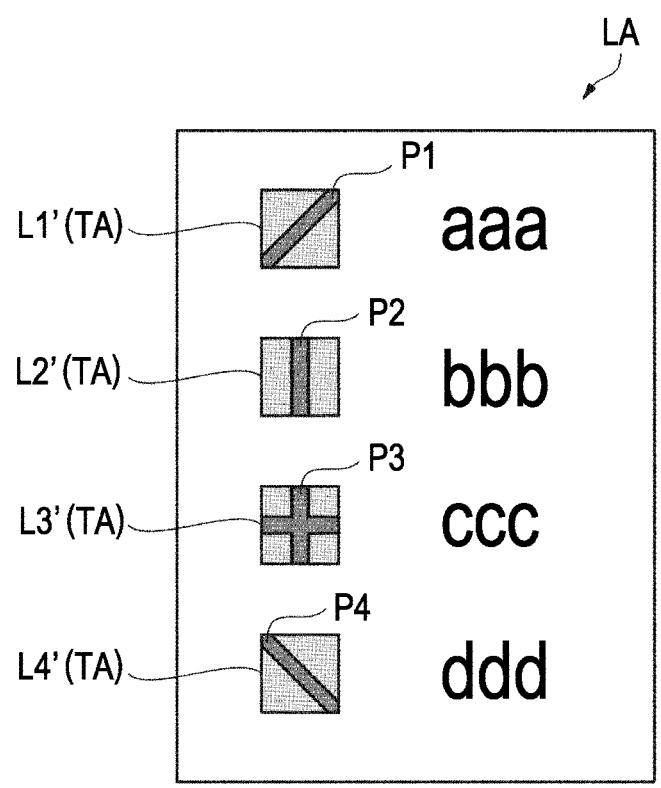
FIG. 13 is a diagram which illustrates an example of a printing result of a monochrome image according to the first embodiment.

FIG. 13 illustrates an example of a printing result of the monochrome image. As illustrated in FIG. 13, by the position correction processing, each color region L' (L1' to L4') which is included in the legend region LA obtains a printing result in which lines configuring the characteristic portion CA of the hatch pattern P1 to P4 are drawn in the center of gravity of each color region L' compared to a case in which the position correction processing which is described in FIG. 8B is not performed.

According to image processing device 100 in the first embodiment, monochrome image data in which hatching of the hatch pattern P corresponding to the color of the color image is performed is generated from the color image data. In addition, due to the position correction processing, the characteristic portion CA of the hatch pattern P is shifted to the center of gravity in the target region TA to which the hatch pattern P is applied. In this manner, as illustrated in FIG. 13, the characteristic portion CA of the hatch pattern P is expressed in the center of gravity of the target region TA. Accordingly, a user easily determines the type of the pattern even in a predetermined region with a small area, and is able to distinguish the difference in color, and user convenience is improved accordingly.

In addition, the original image is generated and corrected as image data to which a pattern corresponding to color information of the original image is applied. Accordingly, it is possible to easily distinguish the difference in color in the original image by discriminating the type of the pattern which is expressed in the generated and corrected image data, and the user convenience is improved.

Hitherto, the first embodiment of the present invention has been described, however, the present invention is not limited to the embodiment, the invention may be changed and modified without departing from the scope of the invention, and it goes without saying that the equivalents thereof are included in the invention as a matter of course. Hereinafter, modification examples will be described.

Modification Example 1

According to the first embodiment, in the position correction processing, the characteristic portion CA is shifted to the center of gravity of the target region TA by moving the characteristic portion by the position deviation amount between the characteristic portion CA of the hatch pattern P and the target region TA, however, it is not limited to this, and it is also preferable to shift the characteristic portion CA so as to move closer toward the center of gravity of the target region TA. For example, it is also preferable to shift the hatch pattern P so that the characteristic portion CA of the hatch pattern P enters a range which has a predetermined distance from the center of gravity of the target region TA.

Modification Example 2

According to the above described first embodiment, the position correction processing has been performed with respect to the target region TA which is smaller than the predetermined size, however, it is not limited to this as a method of determining a region in which the position correction processing is performed. The position correction processing may be performed with respect to the entire target region regardless of the size, and the position correction processing may be performed according to a type, by determining a type of a region, for example, such as the legend region LA, or the like.

Modification Example 3

According to the first embodiment, a case has been described in which the color image data is converted to monochrome image data with the hatch pattern, however, image data after conversion is not limited to the monochrome image data, and it may be color image data. For example, when RGB color image data is converted to CMYK color image data, it is possible to print a color image with the hatch pattern using a printing unit, or the like, and in a printing result thereof, color of the original color image is expressed by the hatch pattern P, not only by color. In addition, when the RGB color image data is converted to RGB color image data with the hatch pattern, it is possible to display a color image with the hatch pattern on a display device such as a display. In this manner, by making the color image with the hatch pattern, it is possible for a variety of users, including a person who is color blind, to distinguish the difference in color from the hatch pattern P, not only a healthy person.

Modification Example 4

According to the first embodiment, when the target region TA is smaller than the predetermined size, the position correction processing has been performed, however, further, when the size of the target region TA is smaller than the minimum size in which a type of the pattern can be distinguished, it is preferable to not perform the position correction processing. By doing that, it is possible to perform more effective processing since the position correction processing is omitted when the pattern cannot be discriminated even if the position correction processing is performed, due to the small target region TA.

Modification Example 5

Figure 14:
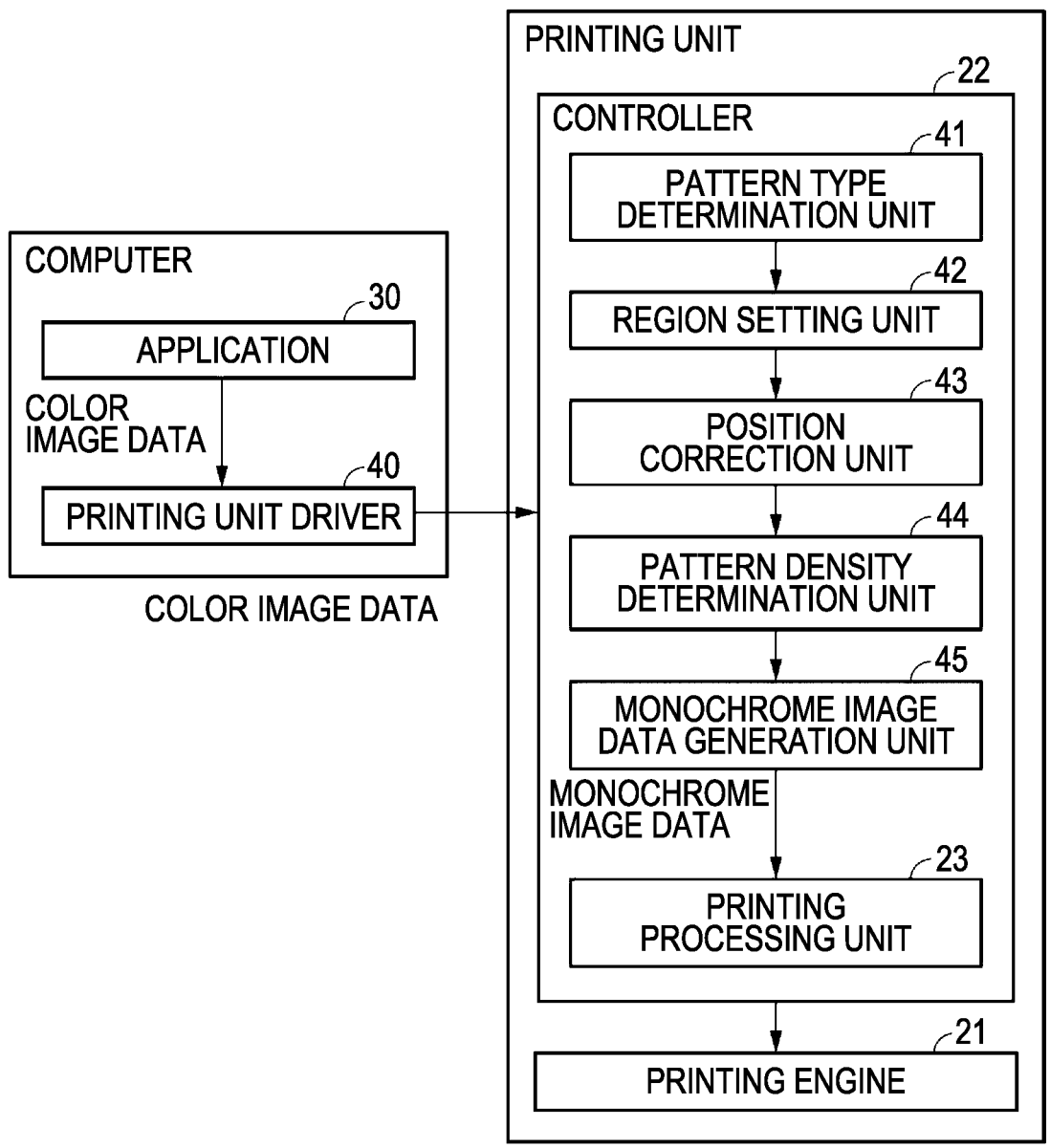
FIG. 14 is an explanatory diagram of a modification example according to the first embodiment.

According to the first embodiment, the color image data has been converted to the monochrome image data with the hatch pattern using a process on the computer 10 side, however, the conversion may be performed using the internal processing of a printing unit. For example, as illustrated in FIG. 14, a controller 22 of the printing unit functions as an image processing device including the pattern type determination unit 41, the region setting unit 42, the position correction unit 43, the pattern density determination unit 44, the monochrome image data generation unit 45, and the printing processing unit 23. The pattern type determination unit 41, the position correction unit 43, the pattern density determination unit 44 and the monochrome image data generation unit 45 perform the same processes as those in the above described first embodiment with respect to the color image data which is transmitted from the computer. When the printing processing unit 23 performs half toning processing or the like with respect to the monochrome image data with the hatch pattern, and outputs the monochrome image data to the printing engine 21, thereby printing a monochrome image in which the difference in color in the original color image can be distinguished.

In addition, it is also preferable to convert the color image data to the monochrome image data through cooperation between the computer and the printing unit. For example, in the system which is illustrated in FIG. 14, the printing unit driver 40 of the computer transmits the color image data to which designation information in which parameters such as the type of pattern, the background density, the foreground density, and the like are designated, is added with reference to the pattern selection table PT. It is also preferable for the pattern type determination unit 41 of the printing unit to determine the type of pattern according to the designation information which is attached to the color image data, and it is also preferable for the pattern density determination unit 44 to determine the background density and the foreground density according to the designation information.

Modification Example 6

According to the first embodiment, the hatch pattern P has been used as a pattern to be applied to the color image, however, it is not limited to this. When it is a pattern having a predetermined regularity, it is also preferable to apply a pattern other than the hatch pattern.

Modification Example 7

According to the first embodiment, the hatch pattern P which is applied to the color image has been allocated to each of the color regions which denotes a corresponding relationship between a color and a legend which are used in the graph, however, it is not limited to this. If it is a region with a small area in which only a part of a pattern can be expressed without expressing the entire pattern in the region, it is preferable to apply the first embodiment. In addition, it is also preferable to apply the first embodiment to a region for describing meanings of marks or the like which are used in a chart, or to contents which are drawn in the chart. In this manner, it is possible for a user to easily distinguish the corresponding relationship in color from a pattern, even if the region in which the pattern, or the contents, are expressed is small.

Hereinafter, a second embodiment of the present invention will be described with reference to drawings. In addition, in the second embodiment, a printing system including a computer as an example of an image processing device will be described.

Figure 15:
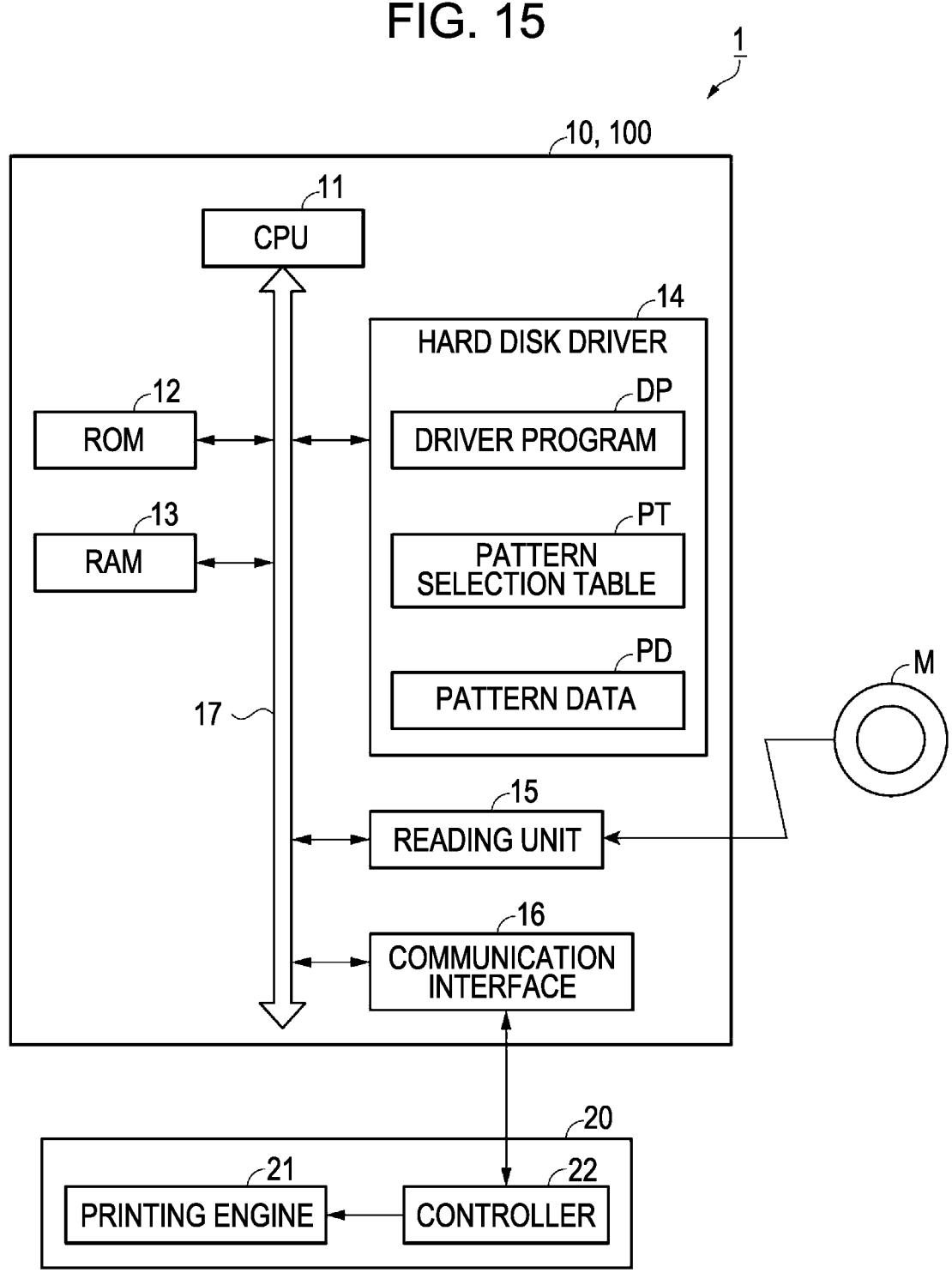
FIG. 15 is a diagram which illustrates a schematic configuration of a printing system according to a second embodiment.

FIG. 15 is a diagram which illustrates a schematic configuration of a printing system 1. As illustrated in FIG. 15, the printing system 1 includes a computer 10, and a printing unit 20, and the computer 10 and the printing unit 20 are connected to each other to be able to perform data communication.

The printing unit 20 includes a printing engine 21 which performs printing on a medium such as a sheet, or the like, and a controller 22 which controls an operation or the like of the printing engine 21. The printing unit 20 performs a process of receiving a printing job from the computer 10, a process of causing the printing engine 21 to execute printing according to the printing job, or the like, using a control of the controller 22.

The computer 10 is, for example, a general-purpose personal computer in which a printing unit driver is installed, and a host device of the printing unit 20 which transmits a printing job to the printing unit 20. The computer 10 includes a CPU 11, a ROM 12, a RAM 13, a hard disk drive 14, a reading unit 15, and a communication interface 16. In addition, those configurations in the computer 10 are connected to a bus 17, and are configured so as to be able to perform data communication with each other through the bus 17.

The CPU 11 is a control device which controls each configuration of the computer 10. The ROM 12 is a non-volatile memory in which a predetermined program, or the like for controlling the computer 10 is recorded, and the RAM 13 is a general-purpose memory which is used as a working memory, or the like.

The hard disk drive 14 is stored with a driver program DP of the printing unit 20, and a pattern selection table PT and pattern data PD to be described later, in advance. The driver program DP is supplied to the computer 10 through a recording medium M in which the driver program DP is recorded, and the hard disk drive 14 is stored with a program which is read out from the recording medium M by the reading unit 15. In addition, as examples of the recording medium M, there are an optical disc such as a CD-ROM, and a DVD-ROM, and a portable recording medium such as a flexible disk, a magneto-optical disc, a USB memory, and a memory card. Further, the recording medium M is recorded with the pattern selection table PT and the pattern data PD, and the pattern selection table PT and the pattern data PD are stored in the hard disk drive 14 along with the driver program DP. In fact, supplying modes of the driver program DP, the pattern selection table PT, and the pattern data PD to the computer 10 are not limited to this, and the driver program DP, the pattern selection table PT, and the pattern data PD may be supplied from a predetermined server, for example, through an electric communication line, or an optical communication line.

The communication interface 16 is a portion of an interface which is connected to the printing unit 20 through a cable, or a radio communication. A communication between the printing unit 20 and the computer 10 is performed through the communication interface 16.

In addition, when the CPU 11 of the computer 10 executes the driver program DP which is stored in the hard disk drive 14 by reading out, the printing unit driver is installed. In this manner, the computer 10 functions as an image processing device 100.

Figure 16:
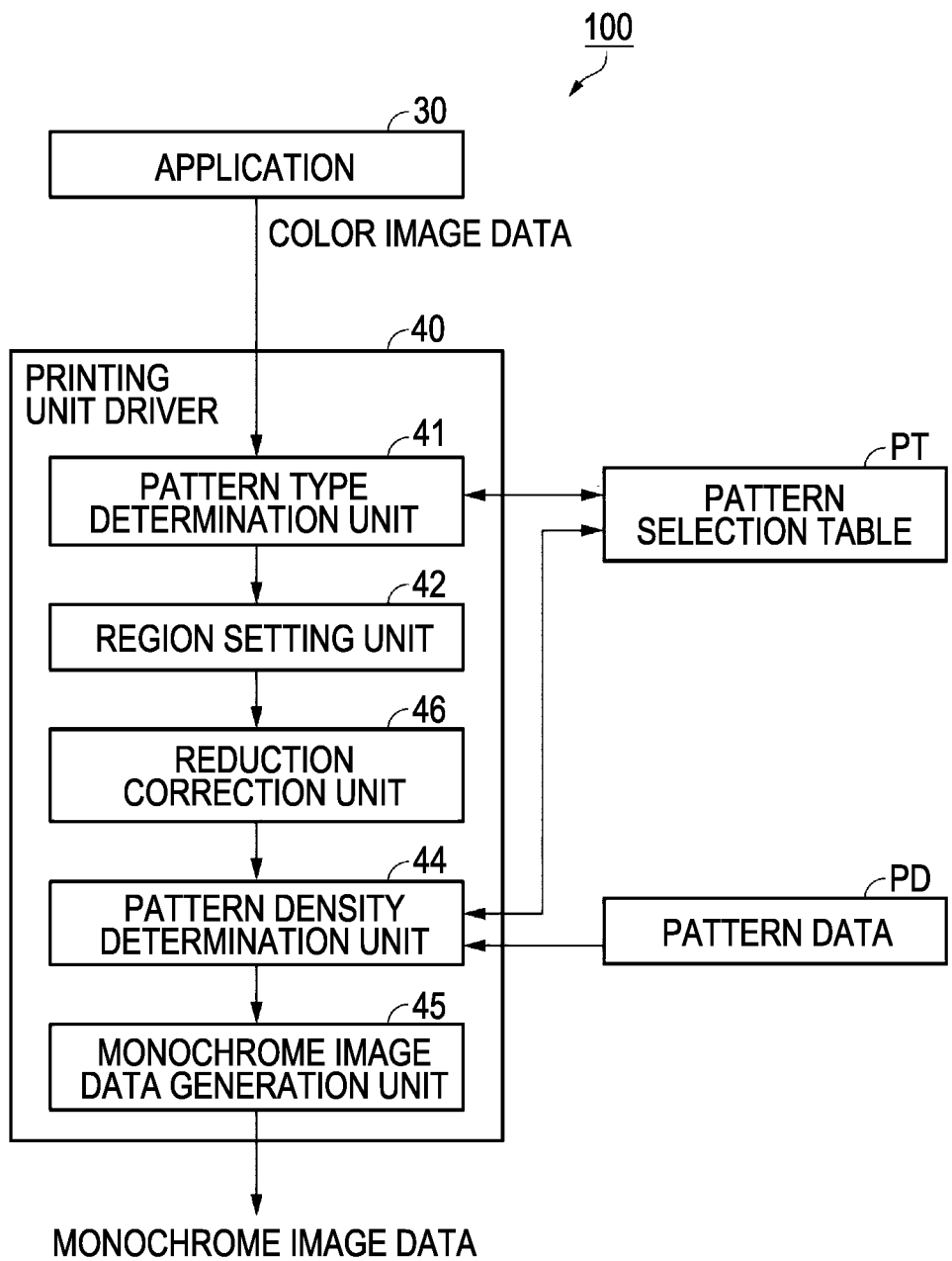
FIG. 16 is a diagram which illustrates a software configuration of an image processing device according to the second embodiment.

Subsequently, the image processing device 100 will be described. FIG. 16 is a diagram which illustrates a software configuration of the image processing device 100. As illustrated in FIG. 16, the image processing device 100 includes an application 30, and a printing unit driver 40.

The application 30 is software as a print demanding source with respect to the printing unit 20 such as document creating software, a web browser, or the like. The application 30 generates color image data as a printing request, or a printing target, and delivers the image data to the printing unit driver 40.

The printing unit driver 40 is software for controlling printing using the printing unit 20. The printing unit driver 40 generates printing data with a data format which can be processed by the printing unit 20 from the printing request, and the color image data which are received from the application 30, and transmits the printing data to the printing unit 20 through the communication interface 16. In this manner, the printing unit driver 40 causes the printing unit 20 to execute printing.

In addition, the printing unit driver 40 according to the second embodiment has a function of causing the printing unit 20 to print a difference in color in the original color image as a monochrome image which can be distinguished by a hatch pattern, by converting the color image data as the original image data to monochrome image data with the hatch pattern. In order to execute the function of monochrome printing with the hatch pattern, the printing unit driver 40 includes a pattern type determination unit 41, a region setting unit 42, a reduction correction unit 46, a pattern density determination unit 44, and a monochrome image data generation unit (image data generation unit) 45. In addition, these configurations of the printing unit driver 40 function when the CPU 11 executes the driver program DP.

The pattern type determination unit 41 performs a process of determining a hatch pattern which is applied to the image region of the color image data according to color information of a color image of the color image data, and in particular, to hue information. In addition, according to the second embodiment, a plurality of types of hatch patterns are used in which hatch patterns such as a vertical line, a horizontal line, a grid line, an oblique line, and an oblique grid line are expressed in monochrome density.

Figure 17:
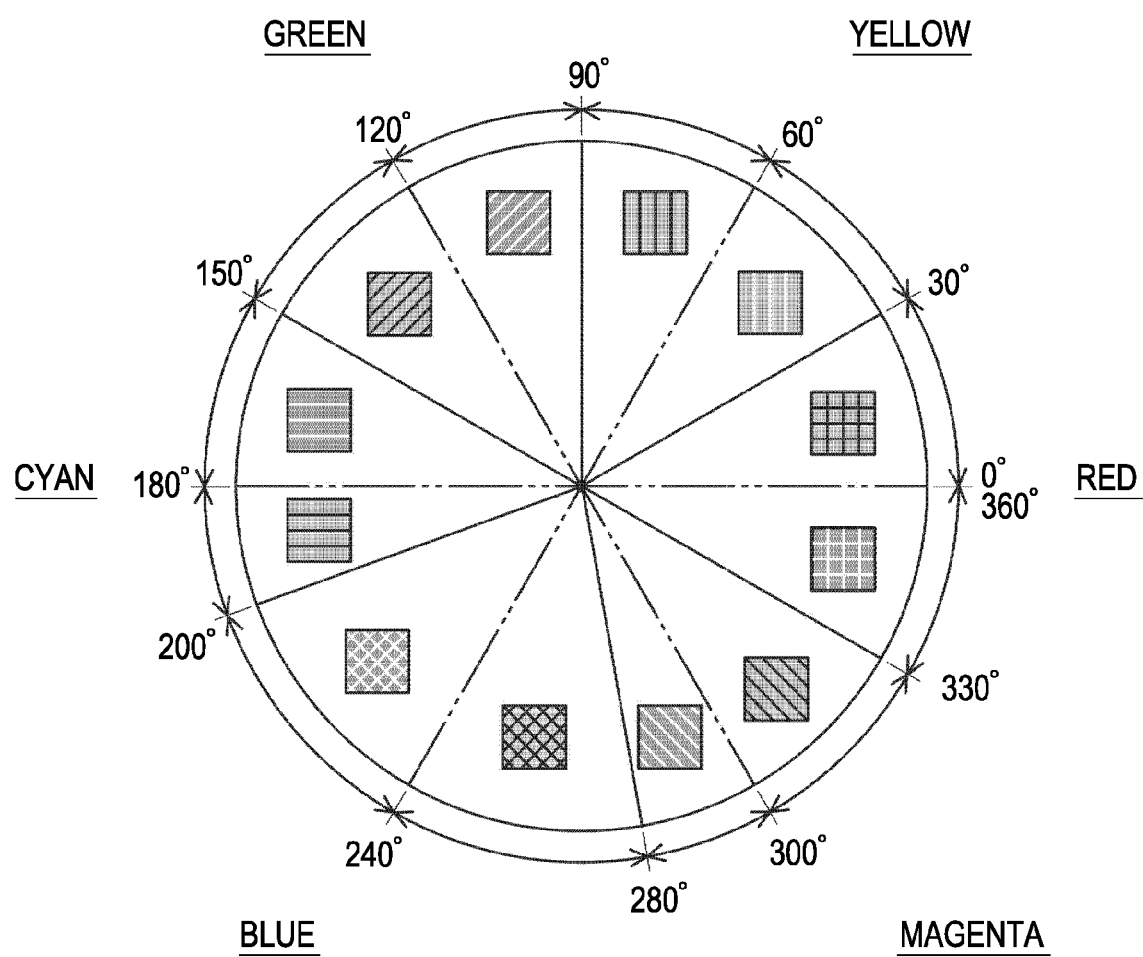
FIG. 17 is a diagram which illustrates a corresponding example between hue and hatch patterns on a hue circle according to the second embodiment.

FIG. 17 is a diagram which illustrates an example in which a hue and a hatch pattern correspond to each other. As illustrated in FIG. 17, a predetermined hatch pattern is allocated in each color region in which a hue circle of color is partitioned with respect to the hue. In the example in FIG. 17, the hue on the hue circle is partitioned into twelve color regions, and patterns such as the vertical line, the horizontal line, the grid line, the oblique line, and the oblique grid line are allocated as the hatch pattern in advance in each color region. The pattern type determination unit 41 selects a hatch pattern to be applied according to the hue of a color image from the plurality of types of hatch patterns. In fact, according to the second embodiment, a different hatch pattern is selected according to the hue from the plurality of hatch patterns, however, it is also possible to select a different hatch pattern according to brightness, or chroma.

The region setting unit 42 performs a process of setting a target region as a target to which the above described hatch pattern is applied in an image region of a color image.

The reduction correction unit 46 performs a process of a reduction correction in which the hatch pattern is reduced in size. The process of reduction correction will be described in detail later.

The pattern density determination unit 44 performs processing of determining a density of a hatch pattern according to color of a color image of color image data, and in particular, to brightness. In addition, the hatch pattern according to the second embodiment includes a foreground region as the hatch pattern itself, and a background region which becomes a background with respect to the hatch pattern as the foreground region. The pattern density determination unit 44 determines a monochrome density in the foreground region (hereinafter, referred to as "foreground density"), and a monochrome density in the background region (hereinafter, referred to as "background density").

The monochrome image data generation unit 45 has a hatch pattern which is determined by the pattern type determination unit 41, and performs a process of applying a hatch pattern having the foreground density and background density which are determined by the pattern density determination unit 44 to a target region among image regions of a color image. In this manner, the monochrome image data generation unit 45 generates monochrome image data with a hatch pattern which is expressed by the applied hatch pattern.

In addition, processes by the above described pattern type determination unit 41 and the pattern density determination unit 44 are performed according to the pattern selection table (corresponding information) PT, and the pattern data PD. Subsequently, in order to describe a method of converting color image data to monochrome image data with a hatch pattern, the pattern selection table PT and the pattern data PD will be described. In addition, in descriptions below, the color image data includes an RGB value which expresses each color of R (red), G (green), and B (blue) with respect to each pixel in a color image using gray scale values of "0 to 255" of 8 bits. The monochrome image data has the K value in which the color of K (black) is expressed by the gray scale values of "0 to 255" of 8 bits in each pixel in a monochrome image, that is, density of the monochromatic K. Further, regarding the RGB value of the color image data, (R, G, B)=(255, 255, 255) corresponds to white, (R, G, B)=(0, 0, 0) corresponds to black, and regarding the K value, K=0 corresponds to black, and K=255 corresponds to white. In fact, according to the second embodiment, the above described color image data and the monochrome image data are described as examples, however, data formats of the color image data and monochrome image data are not limited to this.

Figure 18:
FIG. 18 is a diagram which illustrates an example of a pattern selection table according to the second embodiment.

FIG. 18 is a diagram which illustrates an example of the pattern selection table PT. As illustrated in FIG. 18, a type of the pattern, the foreground density, and the background density are correlated with the RGB value as a color value in advance in the pattern selection table PT.

As described in FIG. 17, a type of a hatch pattern corresponding to a color value among the plurality of types of the hatch patterns such as the vertical line, the horizontal line, the grid line, the oblique line, and the oblique grid line is designated in a section of the pattern type of the pattern selection table PT. The smaller number of types of the hatch patterns than the number of combinations of color values having at least one piece of color information is designated. That is, when color information of the color image is determined, a type of the hatch pattern corresponding thereto is unambiguously determined, accordingly, the number of types of the hatch pattern is designated so as to reduce a load in generation processing of the monochrome image data. In addition, since it is possible to reduce the number of types of the hatch pattern with respect to the color information of an image, the number of types of a similar hatch pattern can be suppressed, accordingly, it is designated such that it is possible for a user to easily discriminate a corresponding relationship between the color of the original color image and the monochrome image data with a hatch pattern which is expressed by the hatch pattern. A value of the foreground density which corresponds to the color value is designated in a section of the foreground density. A value of the background density which corresponds to the color value is designated in a section of the background density. In addition, the values of the foreground density and background density are predetermined before and after applying the hatch pattern so that average brightness in an applying region becomes equal. In this manner, since the density of the pattern and/or the density of the image corresponding to the color information of the original image are changed, it is possible for a user to easily discriminate the corresponding relationship in color of the original image.

A type of the hatch pattern, the foreground density, and the background density corresponding to a RGB value of a color image are determined by the pattern selection table PT. That is, when converting color image data to monochrome image data, the pattern type determination unit 41 selects a hatch pattern of the hatch patterns which are designated in the section of the pattern type of the pattern selection table PT with respect to an image region of color image data with reference to the pattern selection table PT. The pattern density determination unit 44 determines the background density of a hatch pattern for a density which is designated in the section of the background density of the pattern selection table PT, with reference to the pattern selection table PT, and determines the foreground density of a hatch pattern for the foreground density which is designated in the section of the foreground density of the pattern selection table PT.

On the other hand, image data of a corresponding hatch pattern is predetermined in each pattern type such as the vertical line, the horizontal line, the grid line, the oblique line, and the oblique grid line, in the pattern data PD. The hatch pattern is, for example, an image of a predetermined size such as pixels of 8×8 vertically and horizontally, and includes at least information denoting a background region and a foreground region in an image region of a hatch pattern. Accordingly, as described later, the pattern density determination unit 44 is able to determine whether the focused pixel in the image region corresponds to the background region, or to the foreground region, when a hatch pattern is applied to the image region of the color image by referring to the pattern data PD.

Subsequently, an outline of processing in which a hatch pattern P is applied to a color image will be described. Here, as illustrated in FIG. 19A, a color image CP having a color value of (R, G, B)=(255, 0, 0) in the whole image region will be described as an example.

Figure 19A:
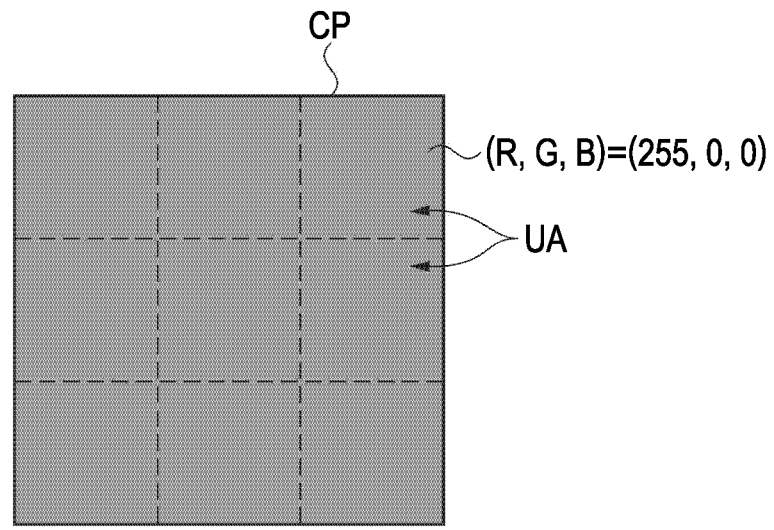
FIGS. 19A and 19B are explanatory diagrams which describe an allocation method of the hatch pattern according to the second embodiment.

In a process of applying the hatch pattern P in the color image CP, first, as illustrated in FIG. 19A, the hatch pattern P is allocated in each unit area UA in which an image region of the color image CP is partitioned with the same size as that of the hatch pattern P. At this time, a type of the hatch pattern P which is allocated to the unit area UA is determined according to the pattern selection table PT. According to the pattern selection table PT which is illustrated in FIG. 18, since the RGB value of the color image, that is, a pattern type corresponding to the color value of (R, G, B)=(255, 0, 0) is the "grid line", the hatch pattern P of the "grid line" is applied to the color image CP in FIG. 19A. Accordingly, as illustrated in FIG. 19B, in a monochrome image MP to which the color image CP is converted is applied with a hatch pattern P of the grid line in each unit area UA.

In addition, according to the pattern selection table PT in FIG. 18, a pattern type corresponding to the color value of (R, G, B)=(0, 0, 0) becomes "none". That is, the hatch pattern P is not applied to a region having the color value of (R, G, B)=(0, 0, 0) among the image regions of the color image, and the hatch pattern P is applied to a region having a color value other than the value of (R, G, B)=(0, 0, 0). Therefore, the region setting unit 42 sets a region having another color value than the value of (R, G, B)=(0, 0, 0) as a target region TA as a target to which the hatch pattern P is applied among the image regions of the color image (refer to FIGS. 20A and 20B).

Figure 19B:
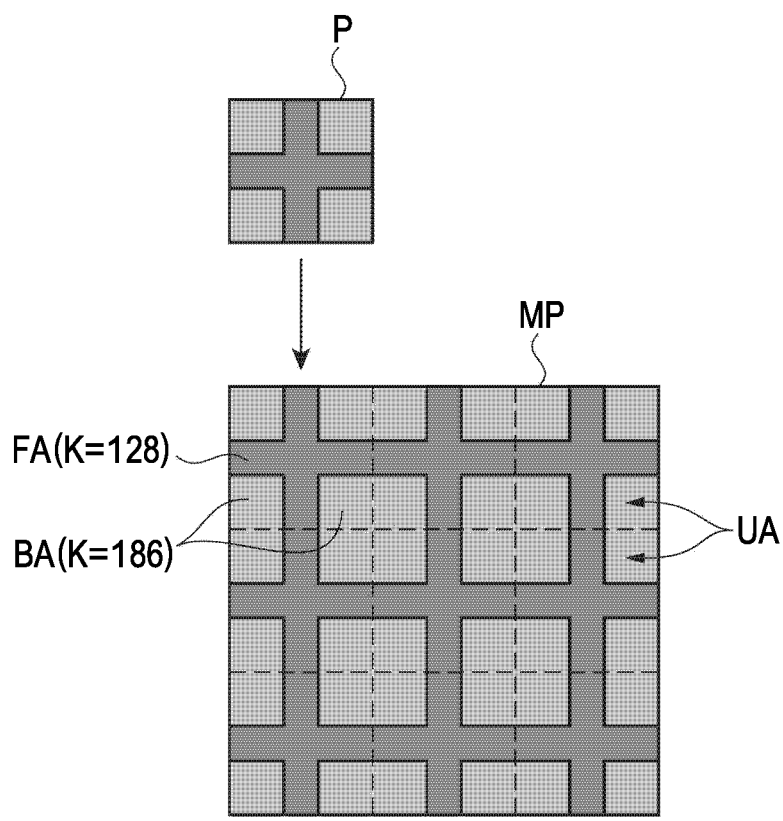

In addition, according to the pattern selection table PT which is illustrated in FIG. 18, since the foreground density of K=128, and the background density of K=186 are correlated with (R, G, B)=(255, 0, 0), as illustrated in FIG. 19B, a density of the foreground region FA becomes K=128, and a density of the background region BA becomes K=186 in the monochrome image MP. In this manner, a hatch pattern P which is determined by the pattern selection table PT and the pattern data PD is applied to the unit area UA. In addition, according to the second embodiment, by performing processing which corresponds to the table in this manner, it is possible to realize a high speed of processing in which the hatch pattern P is applied to the target area TA of the color image CP.

Figure 20A:
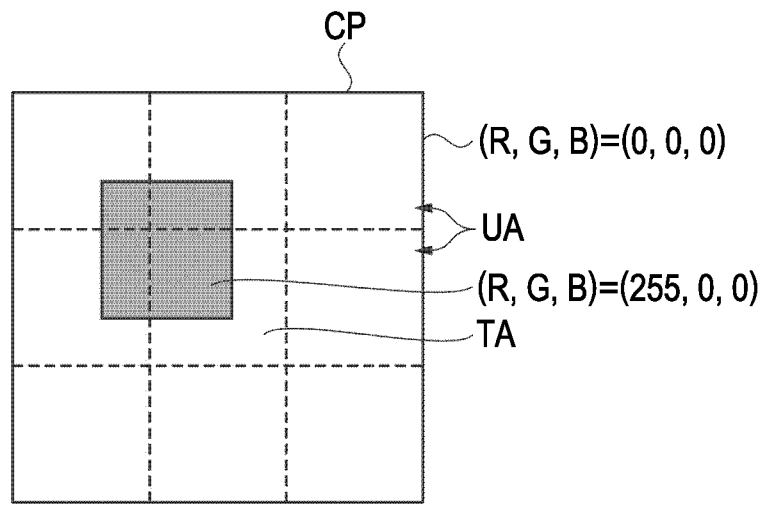
FIGS. 20A and 20B are diagrams which illustrate a result to which the hatch pattern according to the second embodiment is applied.
Figure 20B:
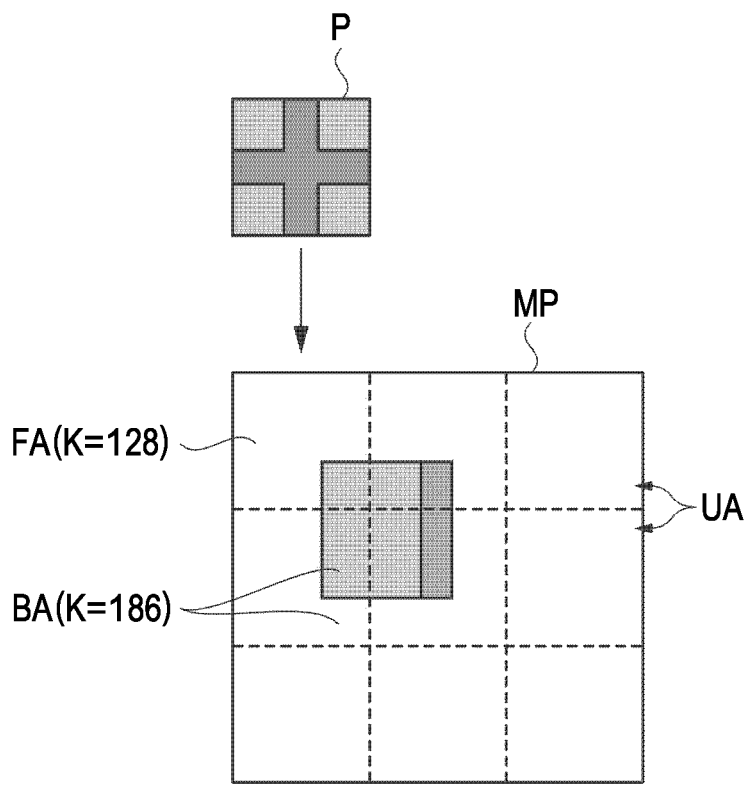

Here, as described above, when the hatch pattern P is applied so that the hatch pattern P is fitted into each unit area UA of the color image CP, there has been a case in which the hatch pattern P is not easily viewed. FIG. 20A illustrates an example of a color image CP in which a part of the target regions TA of the color image CP has a color value of (R, G, B)=(255, 0, 0), and other areas have a color value of (R, G, B)=(0, 0, 0). When the hatch pattern P of the grid line is applied to each unit area UA with respect to the color image CP which is illustrated in FIG. 20A, only the target region TA having the color value of (R, G, B)=(255, 0, 0) is applied with the hatch pattern P of the grid line, since the hatch pattern P is applied to the color value of (R, G, B)=(0, 0, 0) according to the pattern selection table PT in FIG. 18. In addition, in the example in FIG. 20A, since the target region TA is divided into four unit areas UA, when the hatch pattern P is applied to each unit area UA, as illustrated in FIG. 20B, there is a case in which, all portions in which lines configuring the grid line are crossed (characteristic portion to be described later) are not expressed in the target region TA. For this reason, it is difficult for a user to discriminate the type of the hatch pattern P of the monochrome image MP from only the image in the target region TA, and to distinguish color of the original color image from the type of the hatch pattern P.

Figure 21A:
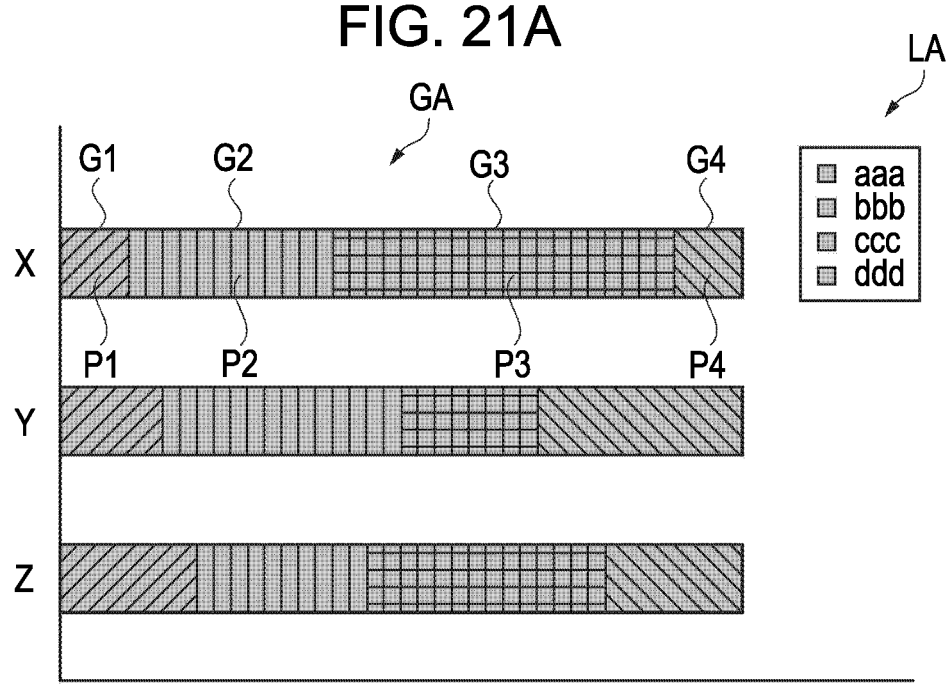
FIGS. 21A and 21B are diagrams which illustrate a result to which the hatch pattern according to the second embodiment is applied.
Figure 21B:
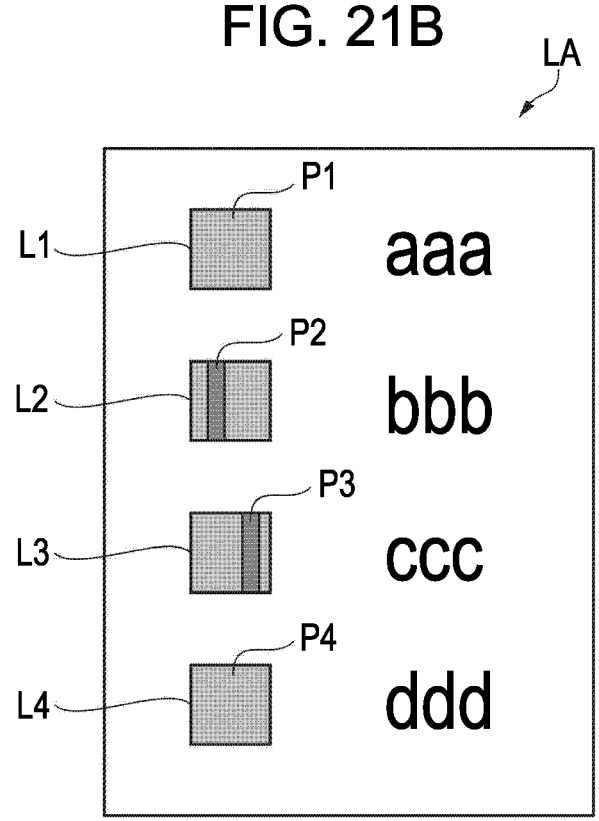

FIGS. 21A and 21B are diagrams which illustrate processing examples when the hatch pattern P is applied to a color image expressing a graph without performing position correction processing. As illustrated in FIG. 21A, regarding a region GA expressing the graph, the hatch patterns P1 to P4 corresponding to colors of the graph are allocated to each of the color regions G1 to G4 configuring the graph. In addition, as illustrated in FIG. 21B as an enlarged diagram of a region of the legend LA in the graph, even in the region of legend LA, the hatch patterns P of P1 to P4 corresponding to colors used in the graph are allocated to each of the color regions L1 to L4 of the legends expressing a corresponding relationship in color used in the graph.

However, in general, since an area of the color region L (L1 to L4) of the legend expressing the corresponding relationship in the color used in the graph is smaller than an area of a region GA expressing the graph, there is a case in which, in the color region L of the legend, only a part of the hatch patterns P which are illustrated in FIGS. 19A and 19B is reflected. In the example in FIG. 21B, the entire line configuring the hatch pattern P is not expressed with respect to the color regions L1 and L4, and it is not possible to determine a corresponding relationship between the color and the legend used in the graph. Regarding the color region L2, the entire line configuring the hatch pattern P is expressed, however, a characteristic portion for determining the regularity which is included in the hatch pattern P is not expressed. Regarding the color region L3, only a part of lines configuring the hatch pattern P is expressed, and further, the characteristic portion for determining the regularity which is included in the hatch pattern P is not expressed with respect to the expressed line, as well. For these reasons, it is difficult for a user to discriminate the hatch patterns P which are expressed in the color regions L1 to L4 of the legend region LA, and to make the graph and the legend to correspond to each other.

Therefore, according to the second embodiment, the reduction correction processing in which the hatch pattern P is reduced in size is performed regarding a small region of the color region LG, or the like, in the example in FIGS. 21A and 21B. For this reason, the reduction correction unit 46 performs the reduction correction processing in which the hatch pattern P is converted to a smaller pattern. By performing the reduction correction processing, as illustrated in FIG. 22, in the target region TA, a regularity which is included in the smaller hatch pattern P is repeatedly expressed, and the monochrome image MP in which the type of the hatch pattern P can be discriminated is generated.

Subsequently, processes to be performed by the above described image processing device 100 will be described in detail with reference to the flowchart in FIG. 23.

Figure 23:
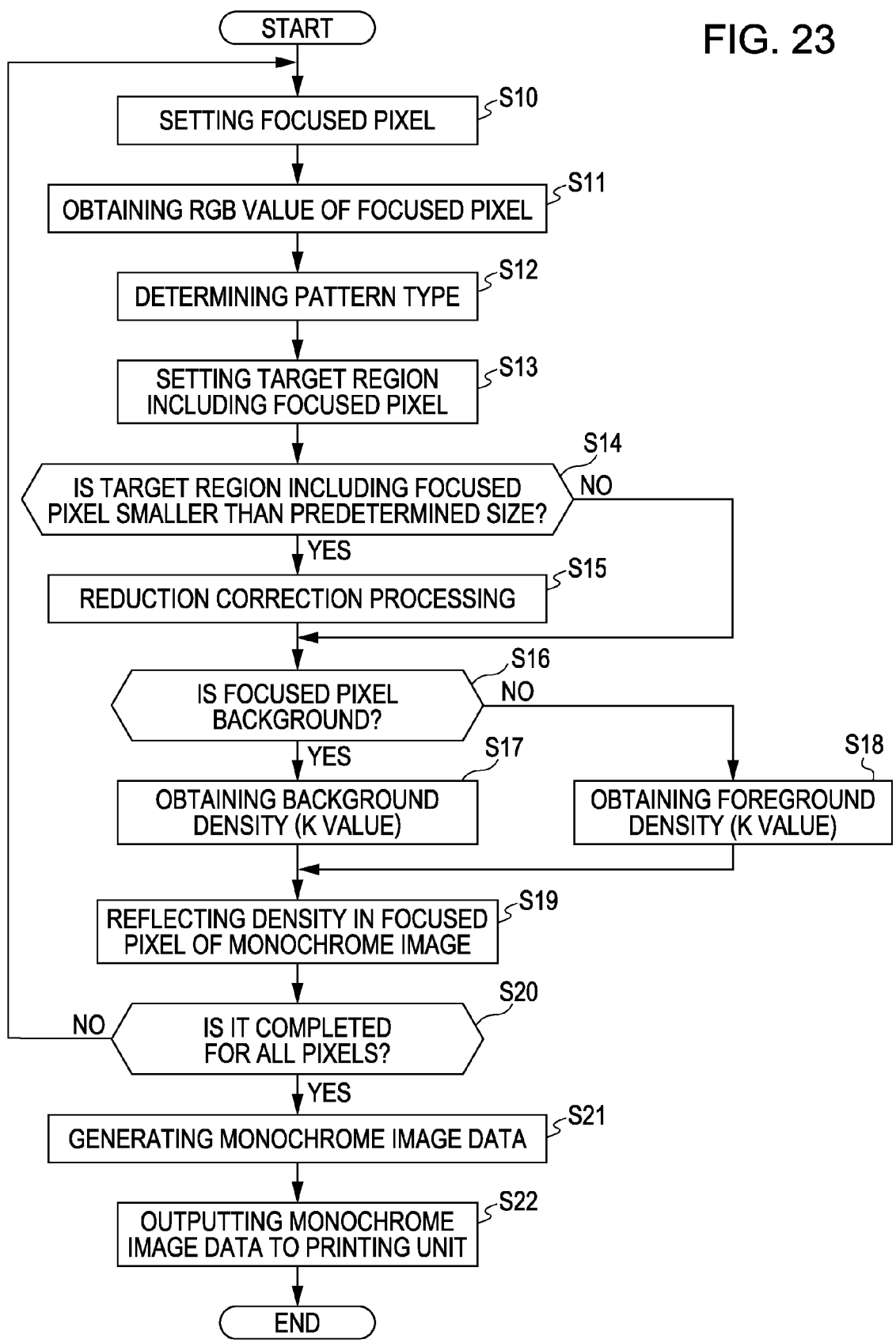
FIG. 23 is a flowchart which illustrates a flow of processing which is performed by the image processing device according to the second embodiment.

For example, when the printing unit driver 40 receives a printing instruction on performing monochrome printing of the color image data from the application 30, processing in FIG. 23 is started. When the processing is started, the pattern type determination unit 41 sets a focused pixel with respect to an image region of the color image data (step S10), and obtains an RGB value of the focused pixel from the color image data (step S11).

Subsequently, the pattern type determination unit 41 determines a pattern type corresponding to the obtained RGB value with reference to the pattern selection table PT (step S12).

Subsequently, the region setting unit 42 performs a process of setting the target region TA including the focused pixel (step S13). Here, a process of specifying a color image region to which the hatch pattern P is applied as the target region TA is performed by scanning pixels in the periphery of the focused pixel. According to the second embodiment, a region having a color value other than the value of (R, G, B)=(0, 0, 0) is set to the target region TA according to the pattern selection table PT. For example, if it is an example of the color image of the graph which is described in FIGS. 21A and 21B, a color region LG expressing a corresponding color relationship between the graph and the legend is set as the target region TA. In fact, a method of setting the target region TA is not limited to this, and it is also preferable to set the target region TA by scanning the entire color image at a timing before setting the focused pixel. In addition, as a method of determining the target region TA, it is not limited to the method in which regions other than (R, G, B)=(0, 0, 0) are set to the target region TA, and for example, it is also preferable to determine a region having a larger RGB value than the predetermined RGB value as the target region TA.

Subsequently, the reduction correction unit 46 determines whether or not the target region TA including the focused pixel is smaller than the predetermined size (step S14).

Figure 24:
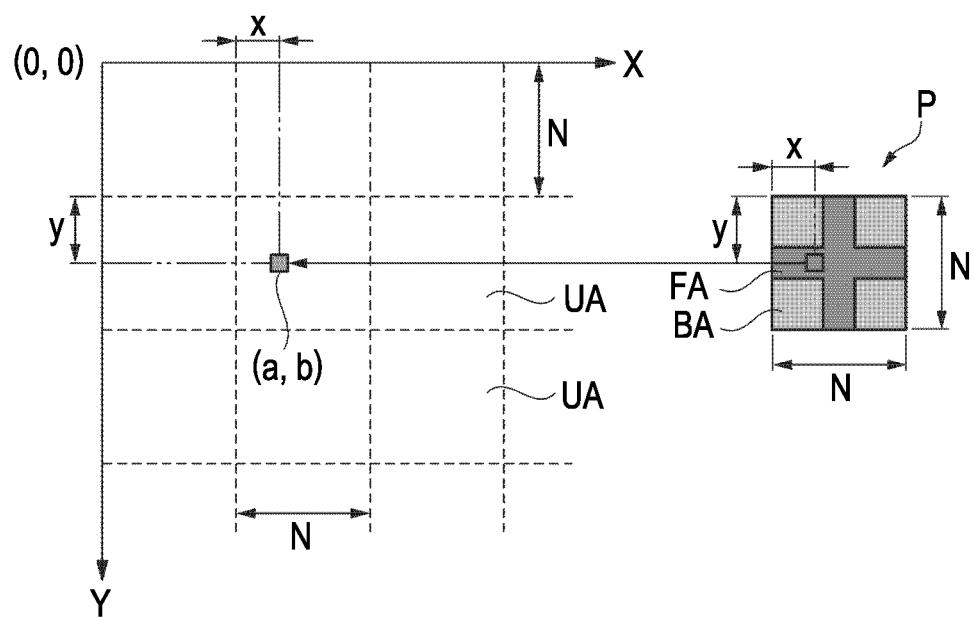
FIG. 24 is an explanatory diagram which describes an allocation method of the hatch pattern according to the second embodiment.

When the target region TA including the focused pixel is larger than the predetermined size (No in step S14), the reduction correction processing is not performed, the process proceeds to step S16, and the pattern density determination unit 44 determines whether or not the focused pixel corresponds to the background of the hatch pattern P. As described in FIGS. 19A and 19B, since the hatch pattern P is allocated to each unit area UA among the image regions of the color image, here, whether the coordinates of the focused pixel are located at a position corresponding to the background, or the foreground in the hatch pattern P which is allocated in each unit area UA is determined. Specifically, as illustrated in FIG. 24, the coordinates of the focused pixel are set to (a, b), and the size of the hatch pattern P is set to N×N pixels, relative coordinates (x, y) of the focused pixel in the hatch pattern P are obtained using the following expressions (1) and (2). The pattern density determination unit 44 determines whether the relative coordinates (x, y) of the focused pixel correspond to the background, or to the foreground in the hatch pattern P with reference to the image data of the hatch pattern P in the pattern data PD. In addition, in the following expression, "mod" is an operator which gives back the rest which is divided.

$$x = a \bmod N \quad (1)$$

$$y = b \bmod N \quad (2)$$

When the focused pixel corresponds to the background (Yes in step S16), the pattern density determination unit 44 obtains a K value of the background density corresponding to the RGB value of the focused pixel with reference to the pattern selection table PT (step S17). On the other hand, when the focused pixel corresponds to the foreground region (No in step S16), the pattern density determination unit 44 obtains a K value of the foreground density corresponding to the RGB value of the focused pixel with reference to the pattern selection table PT (step S18). In the example in FIG. 24, since the relative coordinates (x, y) corresponding to the focused pixel (a, b) correspond to the foreground region FA of the hatch pattern P, the K value of the foreground density is obtained with respect to the focused pixel.

On the other hand, in a determination in step S14, when the target region Ta including a focused pixel is smaller than the predetermined size (Yes in step S14), the reduction correction unit 46 performs the reduction correction processing of reducing the hatch pattern P (step S15). In addition, a reduction magnification of the reduction correction processing is determined according to the size of the target region TA. For this reason, the smaller the target region TA, the more the hatch pattern P is reduced in size to a pattern P' which is smaller than the hatch pattern P. In addition, it is preferable that the reduction magnification of the reduction correction processing be set so that the length of one side of the unit area UA becomes an integral multiplication of the length of one side of the hatch pattern P'. By doing that, since one, or a plurality of hatch patterns P' which are subject to the reduction correction are arranged without a gap with respect to the unit area UA, the patterns of the hatch pattern P' are not discontinuously connected between the unit areas UA, and are expressed as natural patterns.

When the reduction correction processing is performed, the pattern density determination unit 44 determines whether or not the focused pixel corresponds to the background of the hatch pattern P' after being subject to the reduction correction (step S16), and when the focused pixel corresponds to the background (Yes in step S16), the pattern density determination unit obtains the background density with reference to the pattern selection table PT (step S17). When the focused pixel does not correspond to the background, that is, it corresponds to the foreground density (No in step S16), the pattern density determination unit obtains the foreground density with reference to the pattern selection table PT (step S18).

In step S17, or S18, when the pattern density determination unit 44 obtains the K value of the background density, or the foreground density, the monochrome image data generation unit 45 makes the K value as the obtained density be reflected in a pixel corresponding to the focused pixel among the image regions of the monochrome image (step S19). In this manner, the pixel of the monochrome image corresponding to the focused pixel has the K value as the density corresponding to the hatch pattern P of a type which is determined in step S12.

Figure 25:
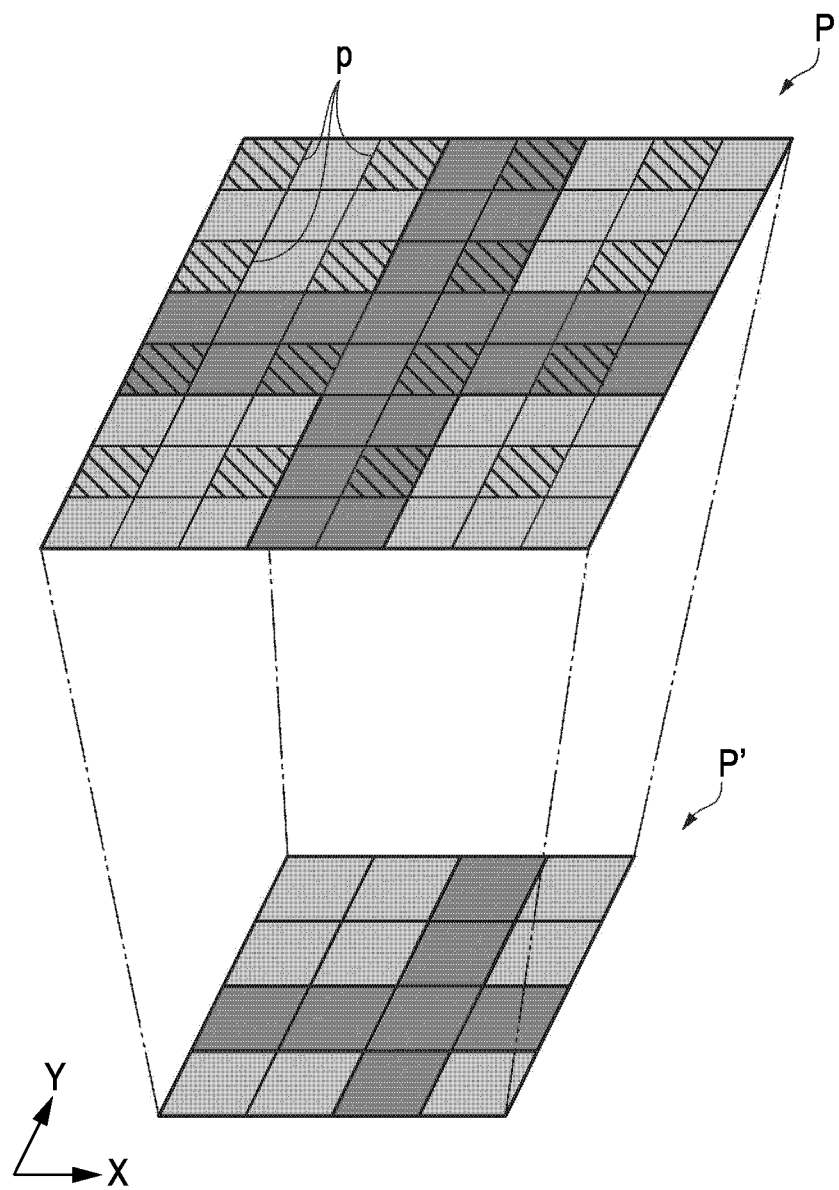
FIG. 25 is an explanatory diagram which illustrates the reduction correction processing according to the second embodiment.

In addition, the above described reduction correction processing is also executed by converting the coordinates of the focused pixel. For example, as illustrated in FIG. 25, when the reduction is performed using the reduction magnification of α=½, a determination in step S16 on whether or not the focused pixel corresponds to the background of the hatch pattern P' which is subject to the reduction correction by determining whether or not the selected pixels p which are selected in every other pixel among pixels configuring the hatch pattern P (oblique line portion in FIG. 25) correspond to the background of the hatch pattern P with reference to the pattern data PD. As a result of the determination, when the focused pixel corresponds to the background of the hatch pattern P', the background density is adopted, and when the focused pixel corresponds to the foreground, the foreground density is adopted. By doing that, the hatch pattern P' which is subject to the reduction correction is applied with respect to the target region TA of the color image. In this manner, when the reduction correction processing is executed by performing the coordinates conversion of the coordinates which are used when referring to the pattern data PD, an operation amount which is necessary for the reduction correction processing is reduced, and it is possible to obtain a high speed of the processing compared to a case in which image data of the reduced hatch pattern P' is generated in practice.

When the background density, or the foreground density is reflected in the focused pixel, the monochrome image data generation unit 45 determines whether or not the processes of steps S10 to S19 are performed with respect to the whole pixels of the color image (step S20). When the process is not finished with respect to the whole pixel (No in step S20), the process returns to step S10, and for example, a new focused pixel is set by scanning the focused pixel in the raster direction, and processes after step S11 are performed with respect to the new focused pixel. When processes are finished with respect to the whole pixel (Yes in step S20), the monochrome image data generation unit 45 generates monochrome image data of the monochrome image (step S21), since it becomes a state in which the whole pixel of the monochrome image has the K value as the density corresponding to the hatch pattern P of a type which is determined in step S12. The generated monochrome image data is output to the printing unit 20 by the printing unit driver 40 (step S22). In this manner, a monochrome image with the hatch pattern corresponding to the color of the color image is printed as a monochrome printing of the color image data which is delivered from the application 30.

Figure 26:
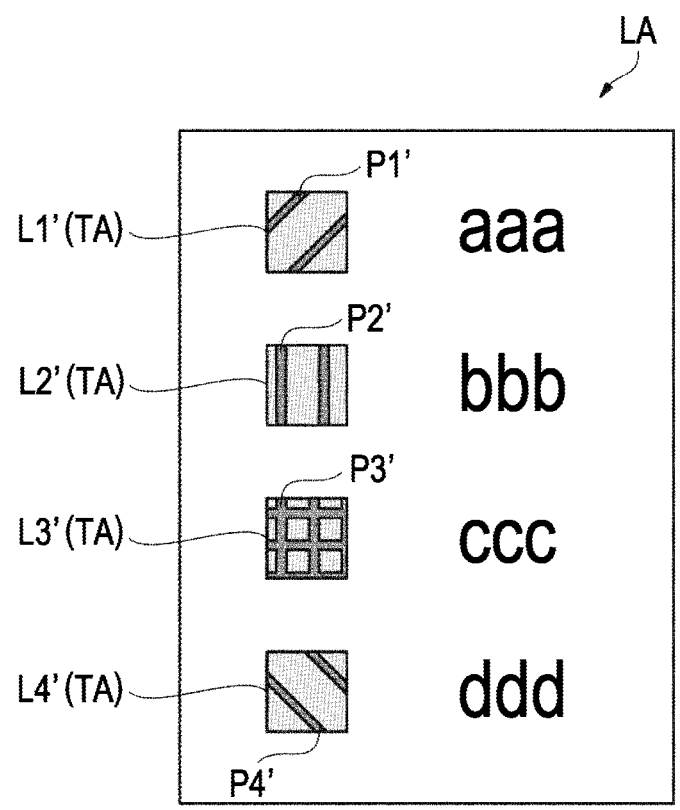
FIG. 26 is a diagram which illustrates an example of a printing result of a monochrome image according to the second embodiment.

FIG. 26 illustrates an example of a printing result of the monochrome image. As illustrated in FIG. 26, by the reduction correction processing, each color region L' (L1' to L4') which is included in the legend region LA obtains a printing result in which thinner hatch pattern P1' to P4' are drawn compared to a case in which the reduction correction processing which is described in FIG. 21B is not performed.

According to image processing device 100 in the second embodiment, monochrome image data in which hatching of the hatch pattern corresponding to the color of the color image is performed is generated from the color image data. In addition, as illustrated in FIG. 26, due to the reduction correction processing, smaller hatch patterns (P1' to P4') are expressed in the target region TA to which the hatch pattern is applied according to the size of the target region TA. Accordingly, since the reduction correction processing is performed with respect to the color region LG denoting the color corresponding relationship between the graph and the legend, a user is able to easily specify a legend corresponding to a hatch pattern which is performed with respect to the graph, and the user convenience is improved.

In addition, in this manner, a user is able to distinguish the difference in color in the original color image by discriminating a type of hatch pattern even when the target region TA is a small region.

Hitherto, the second embodiment of the present invention has been described, however, the present invention is not limited to the embodiment, the invention may be changed and modified without departing from the scope of the invention, and it goes without saying that the equivalents thereof are included in the invention as a matter of course. Hereinafter, modification examples will be described.

Modification Example 8

According to the second embodiment, a case in which the color image data is converted to the monochrome image data with the hatch pattern has been described, however, the second image data after conversion is not limited to the monochrome image data, and may be the color image data. For example, if it is a case in which the RGB color image data is converted to CMYK color image data, it is possible to print a color image with the hatch pattern using a printing unit, or the like, and the result of the printing is expressed with the color of the original color image, not only color. In addition, when the RGB color image data is converted to RGB color image data with the hatch pattern, it is possible to display a color image with the hatch pattern on a display device such as a display.

Modification Example 9

According to the second embodiment, when the target region TA is smaller than the predetermined size, the reduction correction processing has been performed, however, further, when the size of the target region TA is smaller than the minimum size in which a type of the pattern can be distinguished, it is preferable to not perform the reduction correction processing. By doing that, it is possible to perform more effective processing, since the reduction correction processing is omitted when the pattern after performing the reduction correction cannot be discriminated due to the small target region TA.

Modification Example 10

According to the second embodiment, only the hatch pattern which is applied to the target region TA which is smaller than the predetermined size has been subjected to the reduction correction processing, however, in this case, the sizes of patterns become different in a plurality of regions (graph region GA and legend region LA in example in FIGS. 21A and 21B) in which the color is the same as each other in the original color image. It is difficult for a user to recognize these as corresponding to the same color. Therefore, when a plurality of the same color regions are included in the original color image, a hatch pattern in which the reduction correction is performed with the same reduction magnification is applied to each of the plurality of regions. In this case, it is preferable that the reduction correction is performed in a plurality of regions including other regions among the plurality of regions using a reduction magnification which is determined according to the size of the minimum region. By doing that, it is easy to discriminate the color in the entire region with the same color. In addition, as a specific processing method, it is preferable that a plurality of regions with the same color are detected by scanning the color image before the reduction correction processing, and to obtain a reduction magnification to be applied to the plurality of regions from a region with the minimum size among the plurality of regions. In fact, it is also preferable to obtain the reduction magnification to be applied to the plurality of regions from the region with the minimum size among the plurality of regions which are determined as the same color, and to apply the reduction magnification to other regions, after the same processing as in FIG. 23.

Modification Example 11

According to the second embodiment, the reduction correction processing is performed in the hatch pattern which is applied to the target region TA with a smaller size than the predetermined size, however, for example, it is also preferable to perform enlargement correction processing in which the hatch pattern is enlarged with respect to the hatch pattern in a larger region than the predetermined size. By doing that, since it is possible to distinguish the color from a large hatch pattern, and by not giving the small hatch pattern to the large area, it is possible for a user to easily discriminate the color.

Modification Example 12

Figure 27:
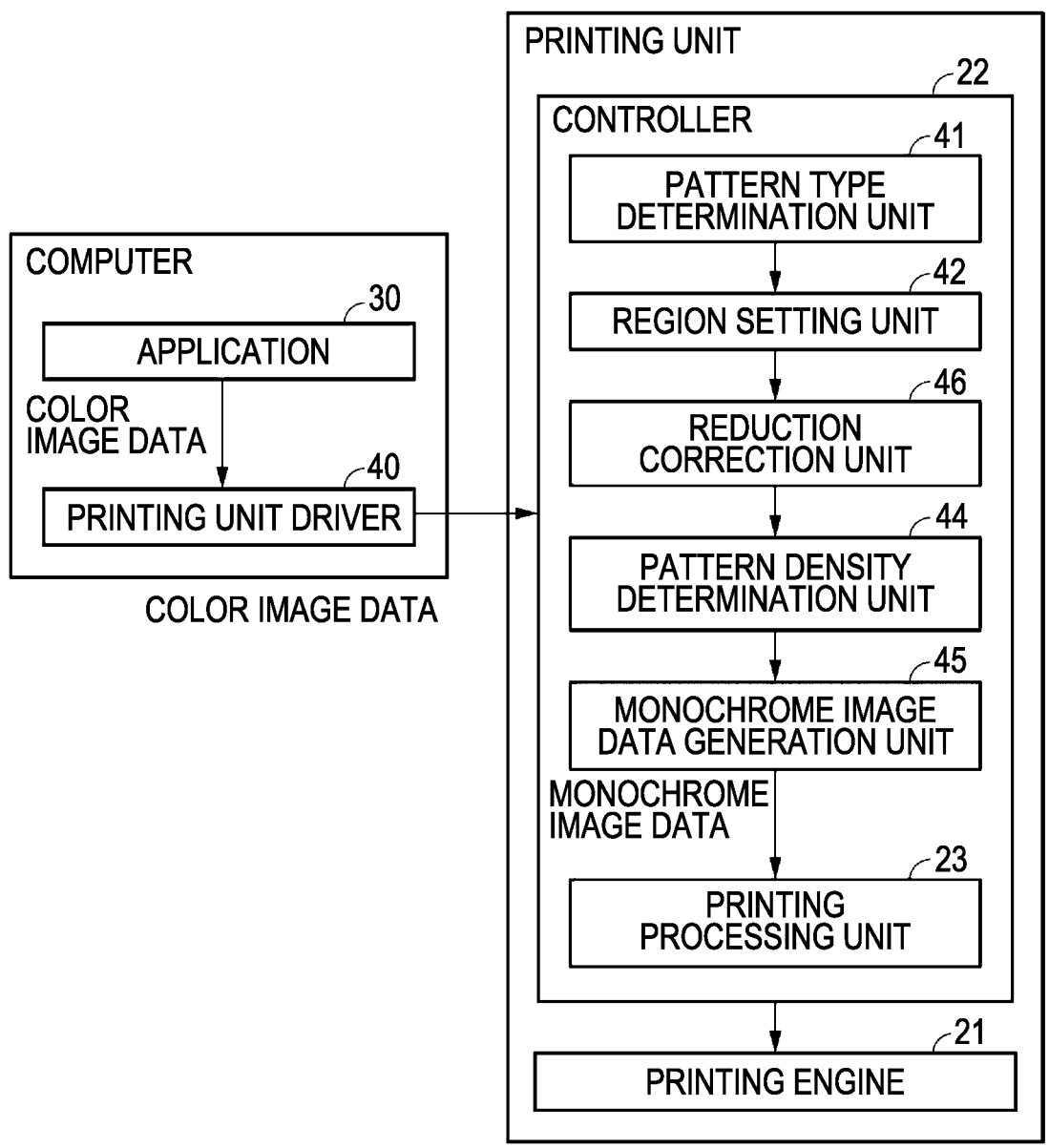
FIG. 27 is an explanatory diagram of a modification example according to the second embodiment.

According to the second embodiment, the color image data is converted to the monochrome image data with the hatch pattern using processing on the computer 10 side, however, the color image data may be converted using internal processing of the printing unit. For example, as illustrated in FIG. 27, the controller 22 of the printing unit functions as the image processing device which includes the pattern type determination unit 41, the region setting unit 42, the reduction correction unit 46, the pattern density determination unit 44, monochrome image data generation unit 45, and the printing processing unit 23. The pattern type determination unit 41, the region setting unit 42, the reduction correction unit 46, the pattern density determination unit 44 and monochrome image data generation unit 45 perform the same processing as that in the second embodiment with respect to the color image data which is transmitted from the computer. The printing processing unit 23 performs half toning processing, or the like, with respect to the monochrome image data with the hatch pattern, and outputs the monochrome image data to the printing engine 21, thereby printing a monochrome image in which the difference in color in the original color image can be distinguished.

In addition, it is also preferable to convert the color image data to the monochrome image data through cooperation between the computer and the printing unit. For example, in the system which is illustrated in FIG. 27, the printing unit driver 40 of the computer transmits the color image data to which designation information in which parameters such as the type of pattern, the background density, the foreground density, and the like are designated is attached with reference to the pattern selection table PT. It is also preferable for the pattern type determination unit 41 of the printing unit to determine the type of pattern according to the designation information which is attached to the color image data, and it is also preferable for the pattern density determination unit 44 to determine the background density and the foreground density according to the designation information.

Modification Example 13

According to the second embodiment, the hatch pattern P has been used as a pattern to be applied to the color image, however, it is not limited to this. When it is a pattern having a predetermined regularity, it is also preferable to apply a pattern other than the hatch pattern.

Modification Example 14

According to the second embodiment, the hatch pattern P which is applied to the color image has been allocated to each of the color regions which denotes a corresponding relationship between a color and a legend which are used in the graph, however, it is not limited to this. If it is a region with a small area in which only a part of a pattern can be expressed without expressing the entire pattern in the region, it is preferable to apply the second embodiment. In addition, it is also preferable to apply the second embodiment to a region for describing meanings of marks or the like which are used in a chart, or to contents which are drawn in the chart. In this manner, it is possible for a user to easily distinguish the corresponding relationship in color from a pattern, even if the region in which the pattern, or the contents are expressed is small.

The entire disclosures of Japanese Patent Application No. 2012-028093 and No. 2012-028094, filed Feb. 13, 2012 are expressly incorporated by reference herein.

What is claimed is:

1. An image processing device comprising:
   a pattern type determination unit which correlates color information of an image with a predetermined pattern;

a region setting unit which sets a predetermined region of the image as an area for applying the predetermined pattern;

an image data generation unit which creates image data which includes the image and the predetermined pattern; and a correction unit which corrects a position of a characteristic portion of the predetermined pattern with respect to the predetermined region, wherein, when the position of the characteristic portion is corrected, a symmetrical center of the characteristic portion approaches the center of the predetermined region.

2. The image processing device according to claim 1, wherein, when the region is a minimum unit or more in which the region can express the characteristic portion, a correction of an application position of the characteristic portion is performed.

3. The image processing device according to claim 1, wherein, when the region is less than the minimum unit in which the region can express the characteristic portion from which a type of the pattern can be discriminated, a size of the pattern is subject to a reduction correction by the size correction unit.

4. The image processing device according to claim 1, wherein a plurality of same color regions are included in the color image, a change in size of the predetermined pattern is applied to the plurality of same color regions is performed by the size correction unit.

5. The image processing device according to claim 1, wherein a density of the pattern and/or a density of the image are changed by the image data generation unit corresponding to the color information.

6. The image processing device according to claim 1, further comprising:

a storage unit in which corresponding information in which the color information, and the patterns of a smaller number than the number of pieces of color information are correlated with each other is stored.

7. The image processing device according to claim 1, wherein the region is a region which denotes a legend.

8. The image processing device according to claim 1, wherein the image data is monochrome image data.

9. An image processing method comprising:

correlating color information of an image with a predetermined pattern;

setting a predetermined region of the image as an area for applying the predetermined pattern;

generating image data which includes the image and the predetermined pattern; and correcting a position of a characteristic portion of the predetermined pattern with respect to the predetermined region, wherein, when the position of the characteristic portion is corrected, a symmetrical center of the characteristic portion approaches the center of the predetermined region.

10. A non-transitory storage medium which causes a computer to function as, a pattern type determination unit which correlates color information of an image with a predetermined pattern;

a region setting unit which sets a predetermined region of the image as an area for applying the predetermined pattern;

an image data generation unit which creates image data which includes the image and the predetermined pattern; and a correction unit which corrects a position of a characteristic portion of the predetermined pattern with respect to the predetermined region, wherein, when the computer corrects the position of a characteristic portion, a symmetrical center of the characteristic portion approaches the center of the predetermined region.

* * * * *